US 6,721,791 B1

(12) United States Patent
Qiao

(10) Patent No.: US 6,721,791 B1
(45) Date of Patent: Apr. 13, 2004

(54) TRAP CONTROL SYSTEM

(75) Inventor: Jingyu Qiao, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 708 days.

(21) Appl. No.: 09/685,860

(22) Filed: Oct. 11, 2000

(30) Foreign Application Priority Data

Jan. 7, 2000 (JP) ...................................... 2000-001693

(51) Int. Cl.[7] ........................................... G06F 15/173
(52) U.S. Cl. ........................................................ 709/224
(58) Field of Search ........................... 709/223–224, 709/318; 345/734–737; 714/4, 47

(56) References Cited

U.S. PATENT DOCUMENTS

| | | | | |
|---|---|---|---|---|
| 5,519,863 A | * | 5/1996 | Allen et al. ................. | 709/318 |
| 5,651,006 A | * | 7/1997 | Fujino et al. ............... | 370/408 |
| 5,909,549 A | * | 6/1999 | Compliment et al. ....... | 709/223 |
| 6,170,005 B1 | * | 1/2001 | Meandzija .................. | 709/217 |
| 6,192,402 B1 | * | 2/2001 | Iwase ......................... | 709/223 |
| 6,253,243 B1 | * | 6/2001 | Spencer ...................... | 709/224 |
| 6,304,576 B1 | * | 10/2001 | Corley et al. ............... | 370/408 |
| 6,360,260 B1 | * | 3/2002 | Compliment et al. ....... | 709/224 |
| 6,633,909 B1 | * | 10/2003 | Barrett et al. .............. | 709/224 |

FOREIGN PATENT DOCUMENTS

JP          09-064871 A    *  8/1995

OTHER PUBLICATIONS

Levi, D., et al., SNMP Applications, RFC–2573, IETF, pp. 1–68 (as printed), Apr. 1999.*

Register for Process Alarms to Alerts, IBM Tech. Disclosure Bulletin, vol. 37, No. 9, pp. 339–344, pp. 1–7 (as printed), Sep. 1994.*

Stallings, W., SNMP, SNMPv2 SNMPv3 and RMON 1 and 2, 3rd ed., Addison–Wesley, pp. 323, 384–385, 455–473, 1999.*

* cited by examiner

Primary Examiner—Andrew Caldwell
(74) Attorney, Agent, or Firm—Westerman, Hattori, Daniels & Adrian, LLP

(57) ABSTRACT

A manager issues a trap entry demand containing a self-address and effective time to an agent to be monitored, for entry therein, and issues a release demand or a time extension demand in response to a release validation demand. An agent receives a trap entry demand from the manager and enters an address of an object of trap and effective time into a database. Upon the occurrence of trap the agent refers to the database to issue a trap to a manager entered as the object of trap. When the effective time expires, the agent issues a release validation command. Receipt of a release demand as the response allows the agent to delete the entry of the object of trap. Receipt of a time extension demand allows it to update the effective time.

6 Claims, 31 Drawing Sheets

FIG. 5

| ID | COMMAND CODE | SENDER | DESCR |
|---|---|---|---|
| 1 | TRAP_REG_REQ | Manager | TRAP ENTRY DEMAND |
| 2 | TRAP_REG_OK | Client | TRAP ENTRY SUCCESS |
| 3 | TRAP_REG_FAILED | Client | TRAP ENTRY FAILURE |
| 4 | TRAP_EXTEND_REQ | Manager | TIME EXTENSION DEMAND |
| 5 | TRAP_EXTEND_OK | Client | TIME EXTENSION SUCCESS |
| 6 | TRAP_RELEASE_REQ | Manager | RELEASE DEMAND |
| 7 | TRAP_RELEASE_OK | Client | RELEASE SUCCESS |
| 8 | TRAP_RELEASE_CONF | Client | RELEASE VALIDATION DEMAND |

FIG. 6A

| SEQUENCE ID |
|---|
| COMMAND |
| TRAP OBJECT |
| EFFECTIVE TIME |
| AUTHENTICATION ID |

FIG. 6B

| SEQUENCE ID |
|---|
| TRAP_REG_REQ |
| Addr1 |
| 2H |
| aaaa |

| TRAP OBJECT | REMAINING EFFECTIVE TIME | AUTHENTICATION ID |
|---|---|---|
| Addr1 | 2H | aaaa |
| Addr2 | 30min | bbbb |

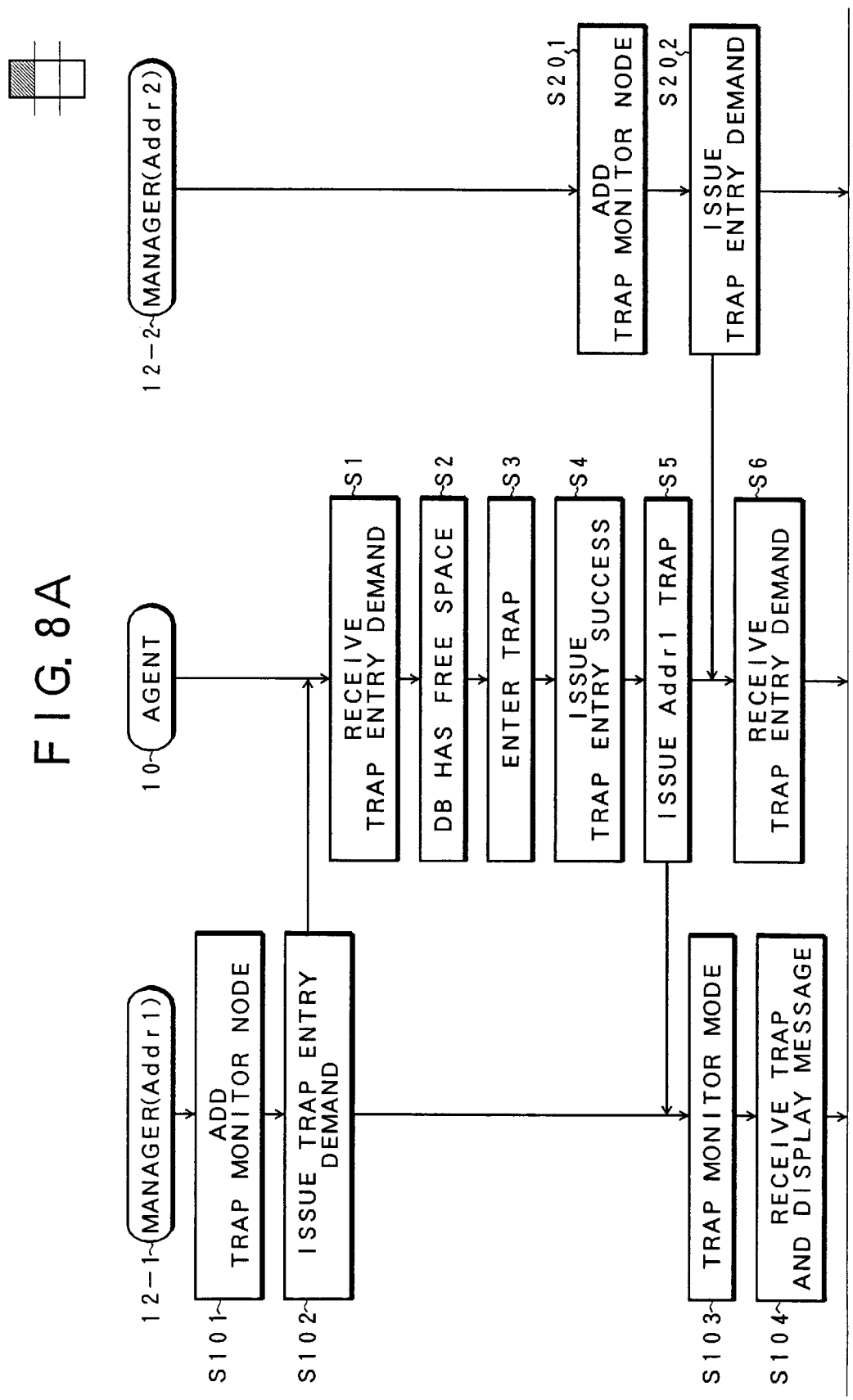

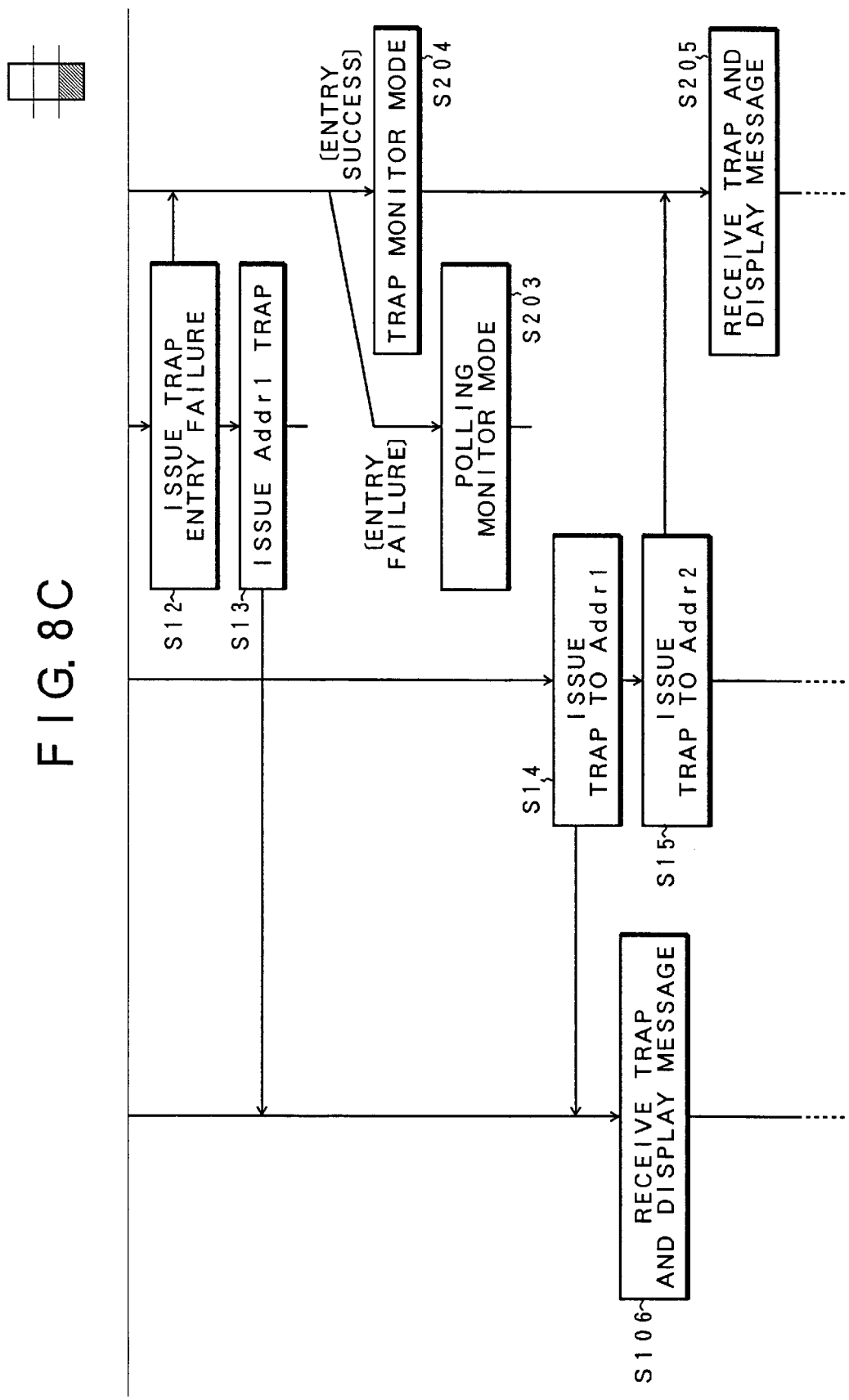

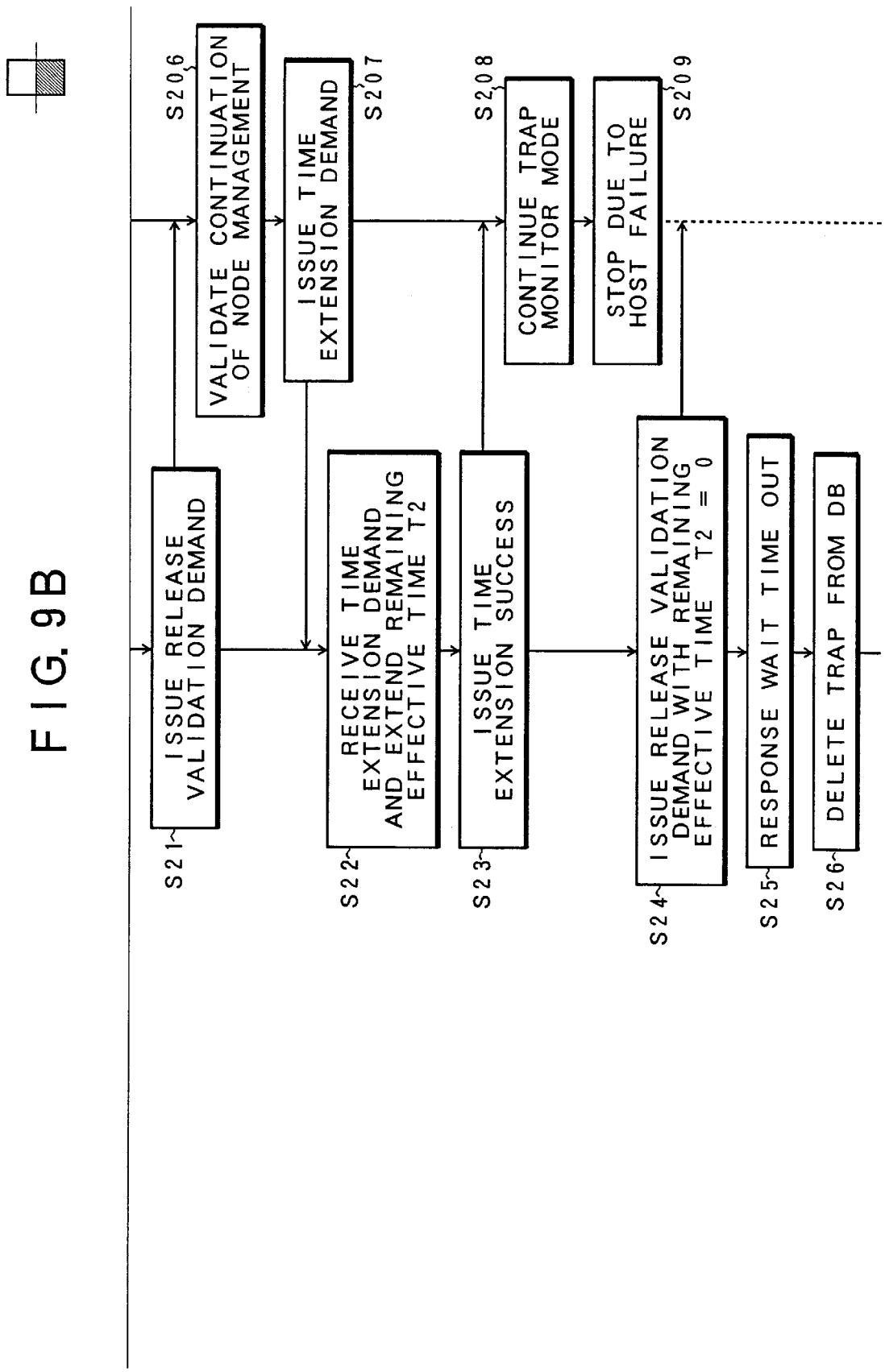

F I G. 1 0
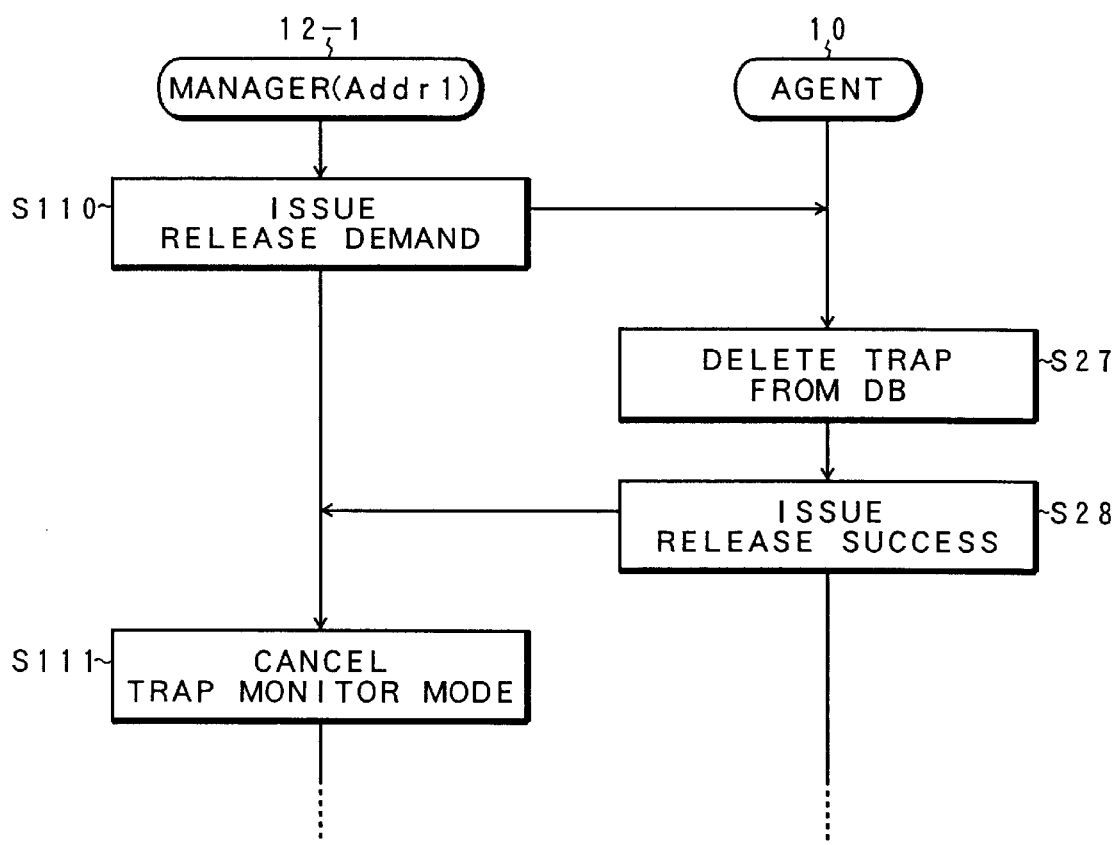

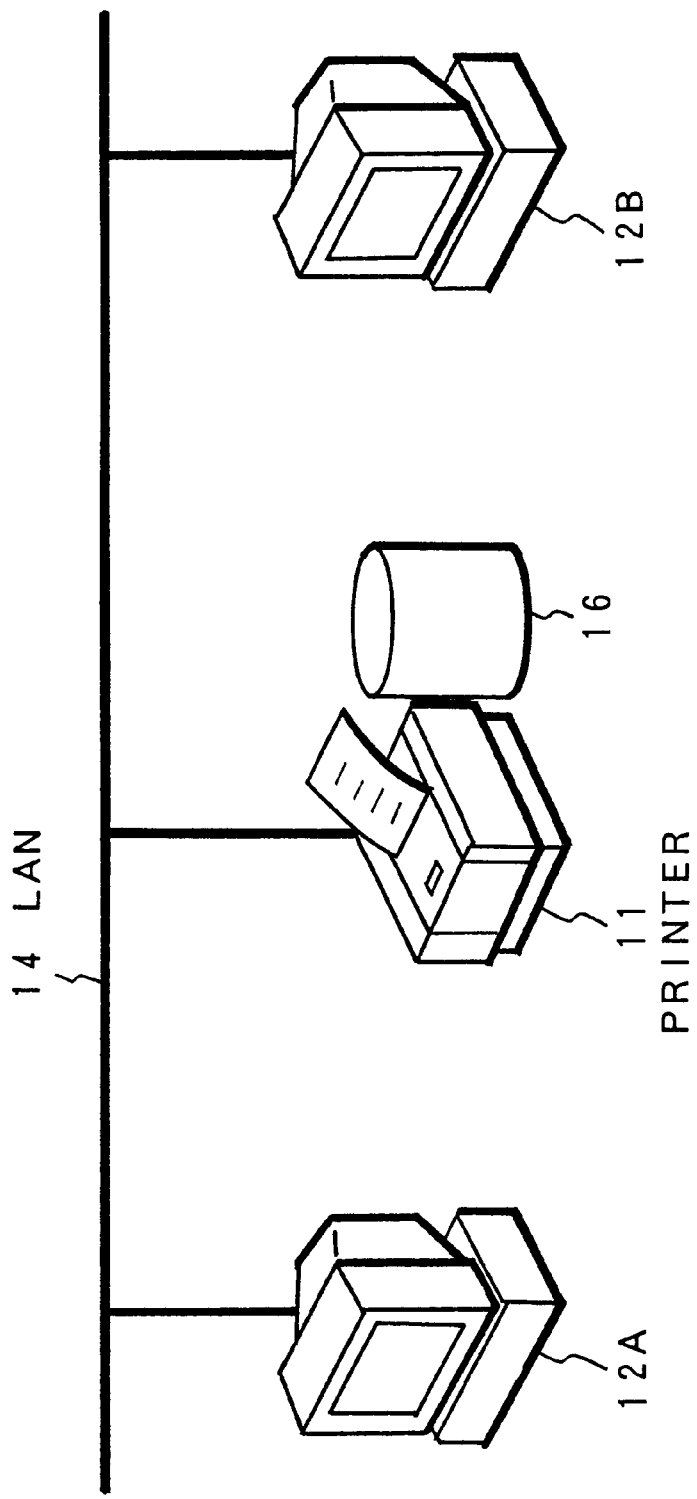

TRAP ENTRY SUCCESS LOG
46

JAMMING OCCURRENCE LOG
48

JAM CANCEL LOG
50

PRINT COMPLETION LOG
52

RELEASE SUCCESS LOG
54

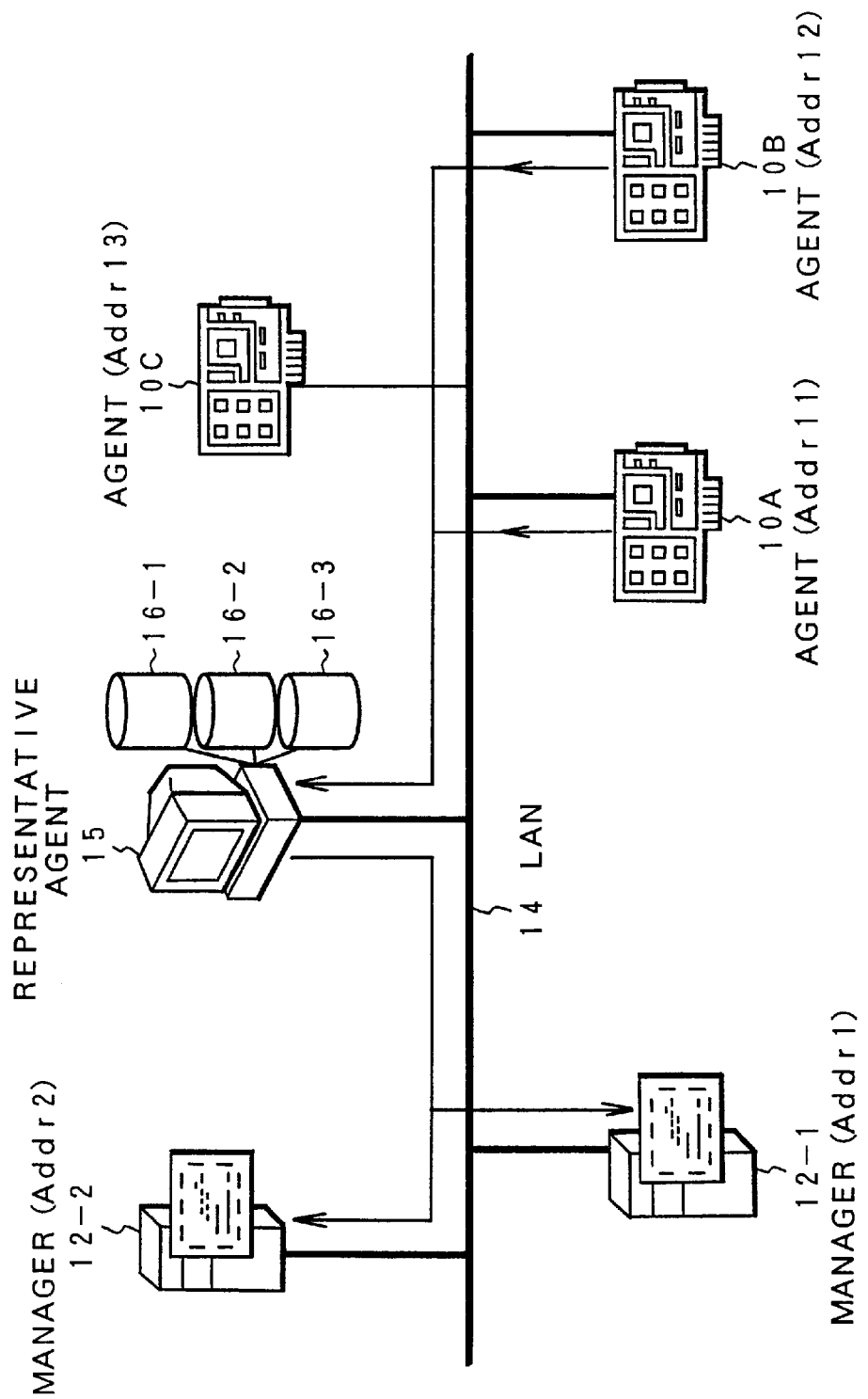

| SEQUENCE ID |
| --- |
| COMMAND |
| TRAP OBJECT |
| EFFECTIVE TIME |
| AUTHENTICATION ID |
| AGENT ADDRESS |

| SEQUENCE ID |
| --- |
| TRAP_REG_REQ |
| Addr1 |
| 2H |
| aaaa |
| Addr11 |

TRAP CONTROL SYSTEM

BACKGROUND OF THE INVENTION

1. Field of the Invention

The present invention relates generally to a trap control system including a manager and an agent which are connected via a network to each other, the agent issuing a trap to the manager, for monitoring, and more particularly, to a trap control system arranged to issue a trap to only the manager which has made an entry as an object of trap into the agent.

2. Description of the Related Art

With recent networks such as LAN expanded and complicated, the network management adds to its importance. For such a network management, use is made of various network management protocols, typically CMIP (Common Management Information Protocol) or SNMP (Simple Network Management Protocol). These management protocols basically use a polling system and an event system. In the polling system the manager asks equipment to be managed at a certain interval to check the status of the equipment to be managed at all times. This system is characterized by its correct monitoring capability but has a demerit tending to cause traffics and lacking in real-time performance. In the event system the equipment to be managed posts the manager on the variation of the status of its own. The event system serves to complement the polling system. Various restrictions are however imposed on the event system. Currently, in the field of the SNMP, typical network management protocol, the event system is called a trap. The trap is issued upon the occurrence of variation of the status from the equipment to be managed such as printers mounted with SNMP agents. The trap from the agent is accepted by a manager in order to grasp the status of the equipment to be managed. The SNMP trap issuance system can include a broadcast system and a unicast system.

FIG. 1 illustrates the broadcast system trap. Now assume that to a subnet 106 are connected an agent 100, managers 102-1 and 102-2 and hosts 104-1 and 104-2, with the agent 100 and the manager 102-1 making up a management group. Herein, the subnet 106 is e.g., a network having an address obtained by adding a 4-bit subnet to an 8-bit network ID, for the address of each node composed of the network ID and the host ID. In such a subnet 106, by using the same address for the subnet of the network ID, the management group can be composed of the agent 100 and the manager 102-1. In the ordinary state of operation the agent 100 issues a broadcast system trap. However, the broadcast trap issued from the agent 100 is accepted only by manager 102-1 lying in the network ID of the same subnet as the target of management. Nevertheless, in the broadcast system, the trap is issued to all the hosts 104-1 and 104-2 lying in the subnet 106. For this reason, traffics tend to occur within the subnet 106. In particular, recently, more and more networks employ switching techniques to control the traffics within the subnet, although there remains a problem of high ratio incapable of controlling the traffics by the broadcast trap. The broadcast issued trap acts not merely on the network traffics but also on the manager managing the trap. When the agent 100 thus issues a broadcast trap, the manager 102-2 not managing the agent 100 also accepts the trap. The manager 102-2 needs to seek a useful trap from the agent which is its own target of management among a multiplicity of traps accepted, resulting in an increased burden on the manager.

In order to solve such a problem of the conventional broadcast issued trap, it is conceivable to issue the trap in the unicast system. In the unicast system, a trap post manager is previously entered into each of the agents so that only the trap entered manager is posted on the trap. In case of the unicast system trap, however, the trap posted object must be entered into the agent previous to the start of use. Such entries are cumbersome and time-consuming, so that the broadcast system has eventually been employed. Furthermore, when the trap posted object is once entered, the agent continues to issue the traps till the cancellation of the entry irrespective of the manager down. Thus, in addition to the occurrence of traffics, the agent does the vain works, which may adversely affect the performances of the equipment to be managed.

Reference is then made to FIG. 2 to consider the case where the trap is issued in the unicast system with the manager 102-1 of the subnet 106 being the object of trap which is entered into the agent 100-1 to 100-n. At that time, in the event of the address modification of the manager 102-1 or the change to the manager 102-2, the entries of the object of trap have to be changed in all the agents 100-1 to 100-n. This change of entries may become enormous and fairly heavy in the circumstances including a lot of equipment to be managed. Furthermore, a limited amount of memory is provided on the equipment to be managed serving as the agent. Hence, if the entries of the object of trap unused are not deleted, more and more memories are used and the resources of the equipment to be managed are consumed.

The above problems are summarized. First, the broadcast system trap entails the problems which follow:

(I) When the trap is issued in the broadcast system, a lot of traffics occur in the network;

(II) The manager outside the subnet is unable to accept the broadcast system trap; and (III) Due to indiscriminate sending of the broadcast trap to all the network apparatuses lying within the subnet, a heavy burden is imposed on each apparatus and managers.

Second, the unicast system trap entails the problems which follow:

(I) In case of the unicast trap, the objects of trap are previously entered, so that a burden is imposed on the manager, making it difficult to use the trap;

(II) Till the cancellation of the previously entered objects of trap, the traps are sent without managing the associated nodes by the manager;

(III) It is substantially impossible for all the entries of the objects of trap to correctly migrate when the management system configuration has been modified; and (IV) The amount of use of the memory is increased in the equipment to be managed, owing to the entries of vain objects of trap.

Such problems may be attributable to a change in network environment being expanded and complicated. The conventional network management is directed mainly to the management of the network apparatuses such as routers and exchanges. On the network, however, there lies a less number of apparatuses such as the routers and exchanges, so that the frequency of occurrence of traffics is small irrespective of the issuance of traps in the broadcast system, thus imposing no burden on the network. In the event that there is a need to alter the setting of the objects of trap in the unicast system, it can be dealt merely by resetting a small number of hosts, and hence too a heavy burden will not occur even though it has manually been done.

The conventional information to be monitored mainly contains equipment status, especially failure information, so that less kind of information lies with limited number of traps issued. In the ordinary operation, the SNMP manager is installed on the dedicated server to manage the network equipment. On a single network the number of such SMNP managers is small and, once set and started to work, frequent change is not made. For this reason, it will suffice for the unicast system to have less information on the SMNP manager which is the object of traps to be entered into the equipment to be managed, with little or no change after the entries. Recently, however, the SNMP network management tends toward new trend together with the expanded and complicated networks. First, office apparatuses such as workstations, personal computers and printers are also managed by the SNMP, adding to the kind and number of the apparatuses to be managed. The information to be managed comes to contain not merely the conventional failure information but also information on tasks, jobs, expendable supplies in operation, for being monitored for statistics or accounting management, resulting in an enormous amount of information as compared with the past.

Furthermore, the SNMP manager monitoring a general apparatus is not a dedicated server, but is capable of being installed into a client using a general personal computer as well, with the result that the number of managers increases in unfixed status. In such an environment, employment of the broadcast system tarp may result in more serious network traffics. Alternatively, employment of the unicast system trap makes it substantially impossible to manually enter the traps one by one. A novel trap control technique is thus desired.

SUMMARY OF THE INVENTION

According to the present invention there is provided a trap control system directed to the SNMP network management and capable of improving the network performances with the minimum influences on the network, manager and agent side equipment to be managed.

The present invention is directed to a trap control system including a manager and an agent which are connected via a network to each other. In such a trap control system, according to a first aspect of the present invention the manager comprises an entry demand processing unit issuing a trap entry demand containing a self-address and trap effective time to an agent to be monitored, for the entry as an object of trap; an effective time management processing unit issuing a release demand for deleting the entry as the object of trap or issuing a time extension demand for continuing the entry as the object of trap, in response to a release validation demand from the agent; and a trap monitor processing unit receiving and processing a trap from an agent which has made an entry demand as the object of trap. The agent comprises a trap entry processing unit entering an address of the object of trap and trap effective time into a database upon the receipt of a trap entry demand from the manager; a trap issuance processing unit referring to the database upon the occurrence of trap to issue a trap to the manager entered as the object of trap; a timeout monitor processing unit issuing a release validation demand to a corresponding manager upon the timeout of the trap effective time of the database; a release processing unit deleting the entry of a corresponding object of trap in the database upon the receipt of a release demand from the manager; and a time extension processing unit updating a corresponding effective time in the database upon the receipt of a time extension demand from the manager. In this manner, the trap control system of the present invention basically issues a unicast system trap instead of a broadcast system trap whereby it is possible to reduce the amount of network traffic to allow even the managers outside the subnet to receive the trap. The manager is able to enter itself as the object of trap into an agent of equipment to be monitored, so that the manager can provide a control of whether the trap of the agent is to be received or not, preventing issuance of vain traps. The protocol between the manager and the agent enables the operations such as the entries and deletions of the objects of trap to automatically be performed without operators, to thereby relieve the burden on the operators, ensuring correct system setting for unicast trap issuance.

In the absence of any response in spite of elapse of a certain period of time after the issuance of a release validation demand to the manager, the timeout monitor processing unit of the agent deletes the object of trap which has expired from the database. By virtue of such an agent-side control of the effective time of the object of trap entered, in the event of down of the manager the agent can cancel the entered object of trap by its own judgement, making it possible to achieve an effective utilization of resources of the agent and to reduce the number of the vain traps. The trap entry demand issued from the manager contains an authentication ID for an entry as an object of trap into the database of the agent, the entry as the object of trap being deleted from the database in case of coincidence by collation of the authentication ID upon the receipt of a release demand command. This achieves improved securities of the entry and cancellation of the object of trap, enabling a substitute third party to perform the entry or deletion of the object of trap. The trap demand processing unit, the release processing unit and the time extension processing unit of the agent issue a demand success to the manager in case of having successfully processed a demand from the agent, but issues a demand failure to the manager in case of having failed to process the demand. This enables the manager to correctly grasp the situations of entries and cancellations of the object of trap in the agent, to take appropriate measures. The trap entry processing unit and the time extension processing unit of the agent have threshold values in the form of the maximum effective time and the minimum effective time of trap effective time such that coincidence with the maximum effective time is made in case the demanded effective time exceeds the maximum effective time and that coincidence with the minimum effective time is made in case the demanded effective time is shorter than the minimum effective time. By allowing this trap effective time to coincide with the maximum effective time, it is possible to obviate the entry of the object of trap exceeding the required time to prevent any unnecessary traps. By allowing the trap effective time to coincide with the minimum effective time, restriction can be imposed on the increased number of times of issuance of commands of the trap entry demand and the time extension demand arising from too short effective time.

According to a second aspect of the present invention there is provided a trap control system including a manager, an agent and a representative agent which are connected via a network to one another, the agent transferring a trap via the representative agent to the manager, for monitoring. In this system, the manager comprises a trap entry demand processing unit issuing to the representative agent a trap entry demand which contains an address of an agent to be monitored, a self-address and trap effective time, for entry as an object of trap; a time management processing unit issuing, with the designation of an agent address, a release demand for deleting the entry as the object of trap or a time extension demand for continuing the entry as the object of trap, in response to a release demand from the representative agent; and a trap monitor processing unit receiving for processing from the representative agent a trap of an agent which has made an entry demand as the object of trap. The representative agent comprises a database provided separately for each agent; a trap entry processing unit which upon the receipt of a trap entry demand from the manager, enters an address as an object of trap and effective time into a database designated by an agent address; a trap issuance processing unit referring to a corresponding database upon the post on a trap from the agent, to issue a trap to a manager entered as an object of trap; a release validation processing unit issuing a release validation demand of a corresponding agent to a manager upon the timeout of the trap effective time of the database; a release processing unit deleting the entry of a corresponding object of trap in a database designated by an agent address, upon the receipt of a release demand from the manager; and a time extension processing unit updating corresponding effective time in a database designated by an agent address, upon the receipt of a time extension demand from the manager. By virtue of such a representative agent function, even in case of the ordinary agent not having the functions of the present invention due to some reasons such as restrictions on memory resources, the trap is generated in the unicast system whose object of trap is the representative agent so that the manager can enter itself as the object of trap into the agent of equipment to substantially be monitored, to thereby control the receipt of trap from the agent.

The above and other objects, aspects, features and advantages of the present invention will become more apparent from the following detailed description when read in conjunction with the accompanying drawings.

BRIEF DESCRIPTION OF THE DRAWINGS

FIG. 5 is an explanatory diagram of a command for use in the trap control of the present invention;

FIGS. 6A and 6B are explanatory diagrams of a command format for use in the trap control of the present invention;

FIG. 7 is an explanatory diagram of a database provided in an agent of FIG. 4;

FIGS. 8A to 8C are timing charts of the trap control effected between a manager and the agent of FIG. 3;

FIGS. 9A and 9B are timing charts continued from FIGS. 8A to 8C;

FIG. 10 is another timing chart continued from FIG. 8B;

FIG. 21 is an explanatory diagram of a specific system of the present invention, in which a printer is managed by hosts;

FIG. 24 is a system configuration diagram of another embodiment of the present invention using a representative agent;

DETAILED DESCRIPTION OF THE PREFERRED EMBODIMENTS

Figure 1:
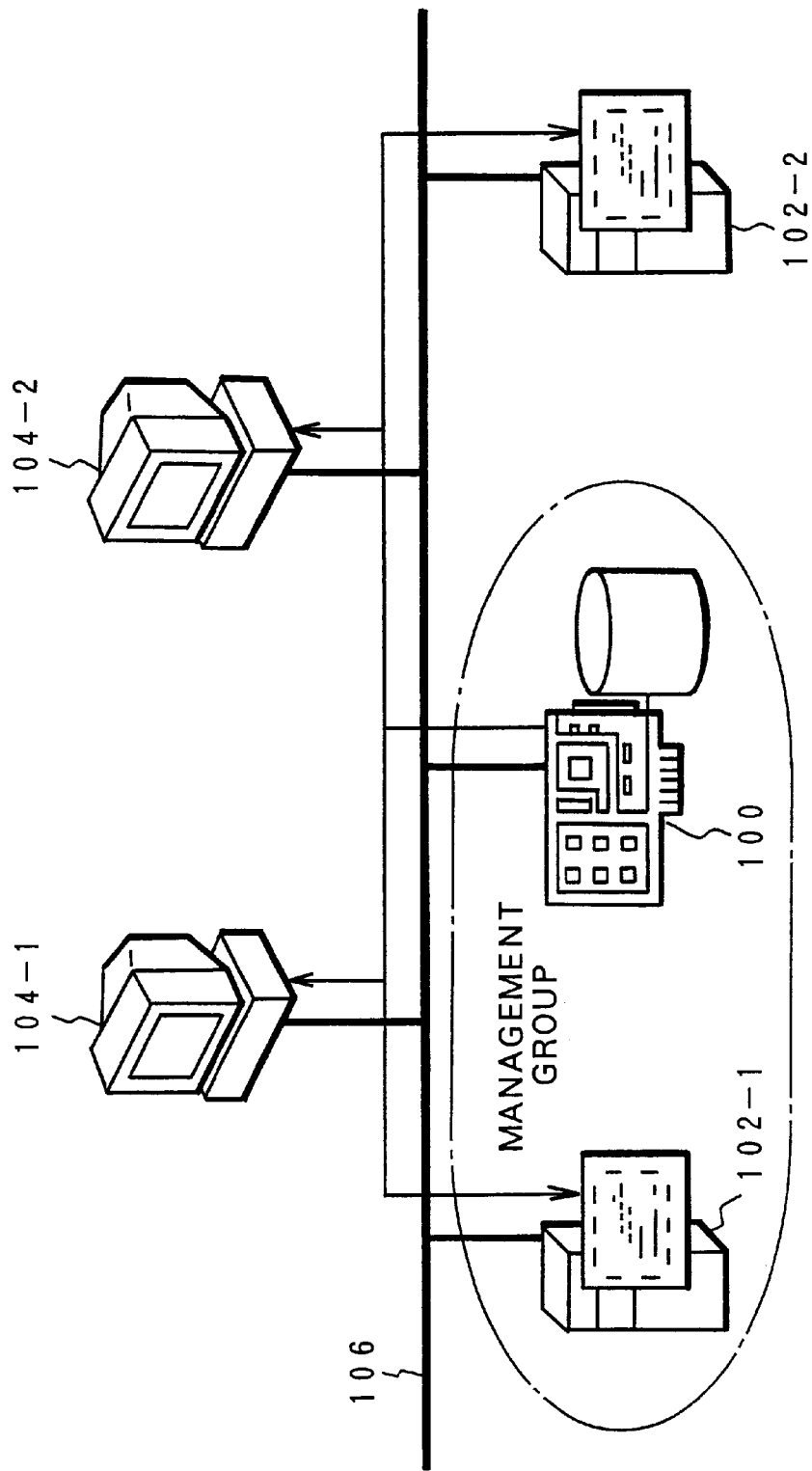
FIG. 1 is an explanatory diagram of a trap control based on the conventional broadcast system.
Figure 2:
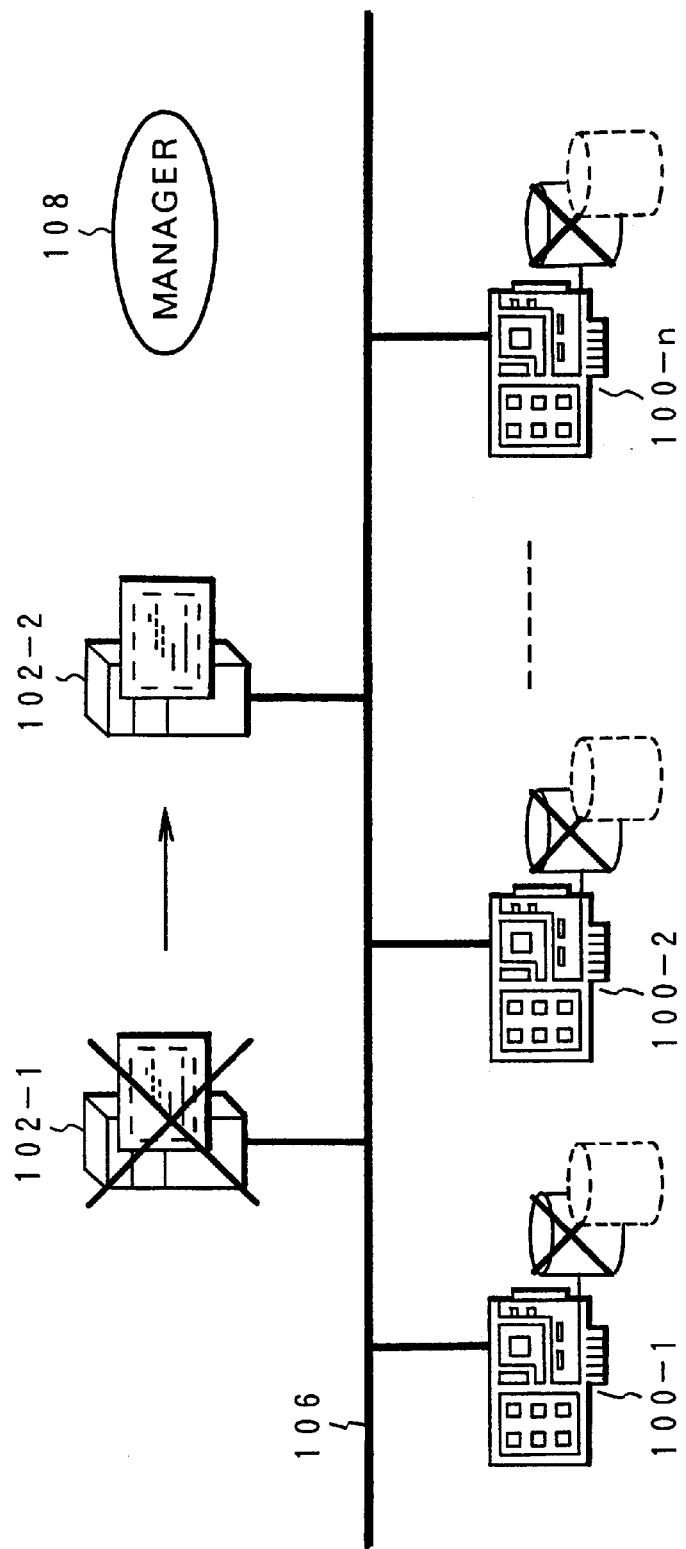
FIG. 2 is an explanatory diagram of a problem which may occur in the conventional unicast system trap control.
Figure 3:
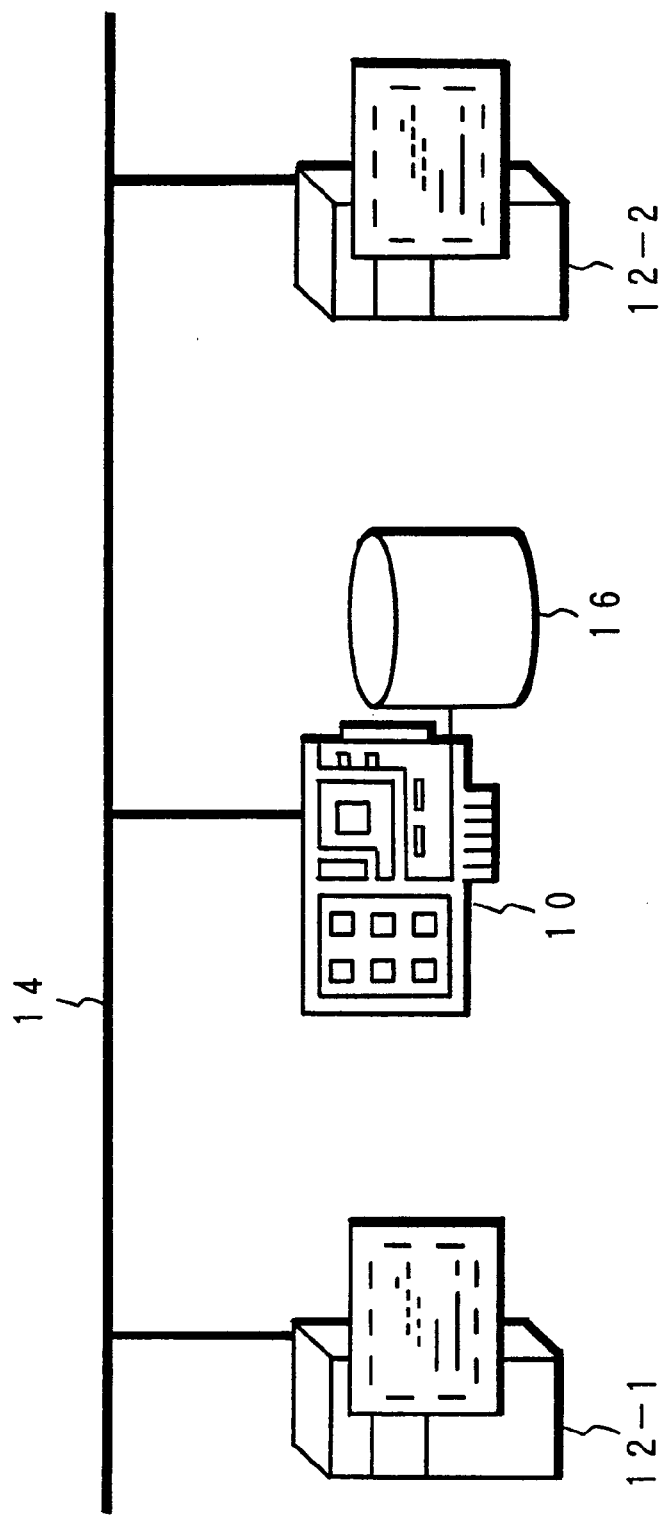
FIG. 3 is a system configuration diagram of the present invention.

FIG. 3 is an explanatory diagram of the system configuration of a trap control system in accordance with the present invention. The trap control system of the present invention comprises a LAN 14 making up a subnet for example, to which are connected an agent 10 and managers 12-1 and 12-2 employing an SNMP as a network management protocol. For simplicity of explanation FIG. 3 shows a part of the trap control system of the present invention, which actually includes a multiplicity of agents 10 and managers which are connected to the LAN 14. The agent 10 and the managers 12-1, 12-2 have their unique addresses, e.g., IP addresses. The IP address is made up of a network, ID and a host ID. In the SNMP network management protocol a subnet is added to the network ID so that a broadcast trap in SNMP can reach only managers belonging to the same subnet as the agent 10. Assume in this case that the agent 10 and the manager 12-1 lie in the same subnet, with the manager 12-2 lying in the other subnet. In cases where the target of monitoring of each of the managers 12-1 and 12-2 is equipment including the agent 10, the trap control system of the present invention enters the object of trap into the agent 10 and stores this entry in a database 16. If a trap occurs in the agent 10 after the entry, the system refers to the database 16 and recognizes the managers 12-1, 12-2 as the entered object of trap to issue traps thereto. By virtue of such a demand of entry as the target of monitoring from the managers 12-1 and 12-2 to the agent 10, the agent 10 can issue traps, in compliance with the entry of the object of trap, not only to the manager 12-1 lying in the same subnet but also to the manager 12-2 lying in the other subnet.

Figure 4:
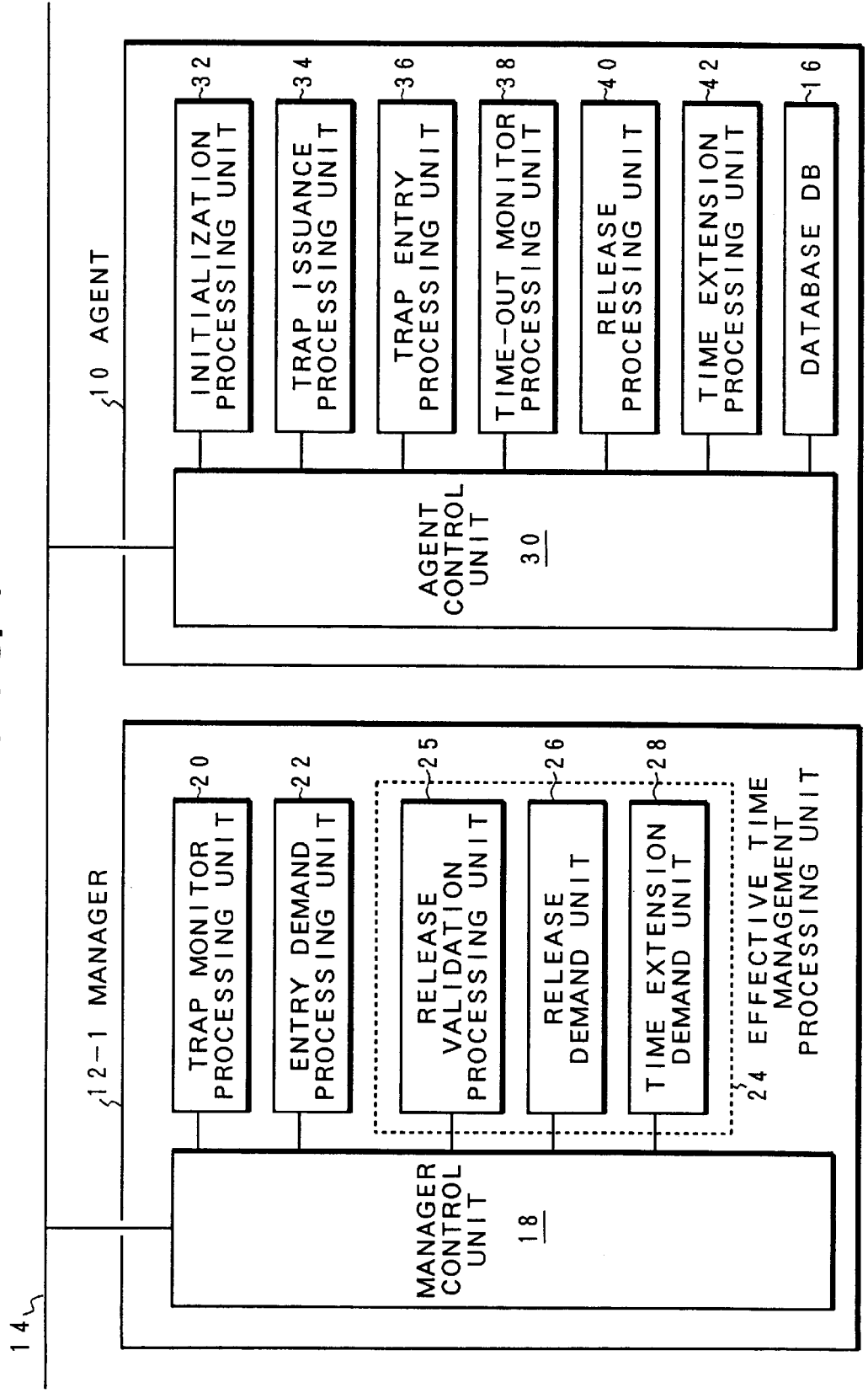
FIG. 4 is a function block diagram of the present invention.

FIG. 4 is a block diagram of the function configuration of the manager 12-1 and the agent 10 of FIG. 3. The manager 12-2 has also the same configuration as that of the manager 12-1. The manager 12-1 comprises a manager control unit 18, a trap monitor processing unit 20, an entry demand processing unit 22 and an effective time management processing unit 24. The effective time management processing unit 24 includes a release validation processing unit 25, a release demand processing unit 26 and a time extension demand unit 28. In compliance with the SNMP the manager control unit 18 interchanges demands and responses with the agent 10. The trap monitor processing unit 20 receives and processes the trap from the agent 10 to which an entry demand has been issued as the object of entry. To the agent 10 included in the equipment as the target of monitoring the entry demand processing unit 22 issues a trap entry demand command message containing an entry demand command, self-address indicative of the object of trap, a trap effective time and an authentication ID for security, and causes the agent 10 to enter the manager 10-1 as the object of trap. In response to a release validation demand from the agent 10, the effective time management processing unit 24 judges by the release validation processing unit 25 whether succession as the object of trap is to be made. If cancellation is judged, then it issues a release demand by the release demand unit 26, whereas if the succession is judged, it issues a time extension demand by the time extension demand unit 28. Corresponding to such functions of the manager 12-1, the agent 10 includes an agent control unit 30, an initialization processing unit 32, a trap issuance processing unit 34, a trap entry processing unit 36, a time-out monitor processing unit 38, a release processing unit 40, a release processing unit 40, a time extension processing unit 42 and a database 16. In compliance with the SNMP as the network management protocol the agent control unit 30 receives and responds to a demand from the manager 12-1. Upon the activation of the agent 10 the initialization processing unit 32 executes initialization processing for reading database. The trap issuance processing unit 34 issues a trap to the object of trap stored in the database. Upon the reception of a trap entry demand from the manager 12-1, the trap entry processing unit 36 enters the object of trap into the database 16. This entry of the object of trap includes entries of the address of the manager 12-1 indicative of the object of trap, the trap effective time and the authentication ID. When the trap effective time stored in the database expires, the time-out monitor processing unit 38 issues a release validation demand to the corresponding manager. Upon the receipt of a release demand from the manager, the release processing unit 40 deletes the entry of the corresponding object of trap in the database 16. Upon the receipt of a time extension demand from the manager, the time extension processing unit 42 updates the trap effective time of the corresponding object of entry in the database 16. When the trap effective time of the database 16 expires, the time-out monitor processing unit 38 issues a release validation demand to the manager. In case of absence of any response to this validation demand in a certain period of time, the agent 10 itself deletes the object of trap which has expired from the database 16. In the event that the demand from the manager has successfully been processed, a demand success is issued to the manager from the trap entry processing unit 36, the release processing unit 40 and the time extension processing unit 42 provided in the agent 10. In the event of failure in the processing of the demand, a demand failure is issued therefrom to the manager. The trap entry processing unit 36 and the time extension processing unit 42 have threshold values in the form of maximum effective time and the minimum effective time of the trap effective time stored in the database 16 so that if the demanded trap effective time exceeds the maximum effective time, the former is caused to coincide with the latter and that if the demanded trap effective time is shorter than the minimum effective time, the former is caused to coincide with the latter.

FIG. 5 shows commands for use in various demands and responses which are interchanged for the trap control between the manager 12-1 and the agent 10 of FIG. 4. FIGS. 6A and 6B show command formats of demands and responses which are interchanged as command messages between the manager and the agent. FIG. 6A shows a basic configuration of the command format, which is composed of sequence ID, command, object of trap, effective time and authentication ID. Command codes are set into the region of command of this command format. The object of trap to be entered is the address of the manager or the agent making a demand or an issuance. FIG. 6B shows the contents of a specific command issued upon the trap entry demand from the manager to the agent. For this trap entry demand, entered after "SEQUENCE ID" is a command "TRAP_REG_REQ" which means the trap entry demand. The address "Addr1" of the agent 12-1 is entered as the object of trap, with "2H (two hours)" as the effective time and "aaaa" as the authentication ID.

For the command explanation of FIG. 5, eight commands ID1 to ID8 are shown and the command ID1 is a trap entry demand to be issued from the manager to the agent, the command ID1 using the command code "TRAP_REG_REQ". The command ID2 is a trap entry success to be returned upon the entry by the agent into the database in response to the trap entry demand, the command ID2 using a command code "TRAP_REG_OK". In the event of failure of entry by the agent, a command code "TRAP_REG_FAILED" is used as the trap entry failure. The next commands ID4 and ID5 are a time extension demand and a time extension success, respectively, and use command codes "TRAP_EXTEND_OK" and "TRAP_EXTEND_OK", respectively. The commands ID6 and ID7 are a release demand and a release success, respectively, and use command codes "TRAP_RELEASE_REQ" and "TRAP_RELEASE_OK", respectively. The last command ID8 is a release validation demand to be issued from the agent to the manager and uses a command code "TRAP_RELEASE_CONF".

FIG. 7 shows the contents of entry upon the entries of the objects of trap by the managers 12-1 the 12-2. The database 16 stores the remaining effective time and the authentication ID of the object of trap for each entry of the object of trap. In this case the manager 12-1 has an address "Addr1" which is entered as the object of trap and whose effective time is "2H" with the authentication ID "aaaa". On the other hand, the manager 12-2 has the self-address "Addr2" entered as the object of trap, whose effective time is "30 min" with the authentication ID "bbbb".

FIGS. 8A to 8C, 9A, 9B and 10 show the trap entry processing effected when the agent 10 of FIG. 3 is the target of monitoring by the managers 12-1 and 12-2, the post-entry trap issuance processing, the release and time extension processing upon the time-out of the trap effective time, and the release processing upon the issuance of a completion trap in the trap issuance processing.

Figure 8B:
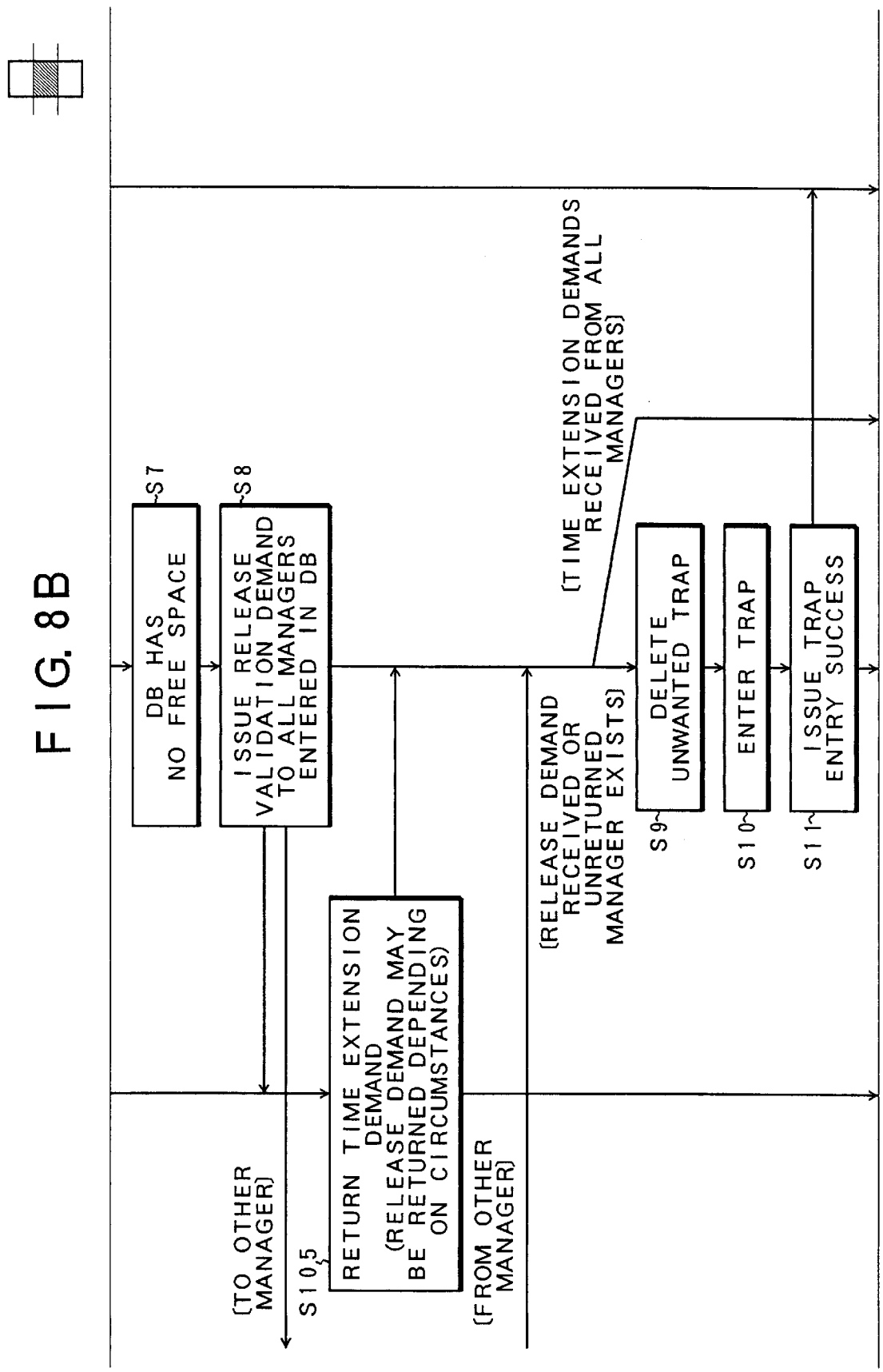

First, FIGS. 8A to 8C are timing charts in cases where the managers 12-1 and 12-2 make a trap entry into the agent 10. If the conditions are satisfied for adding the agent 10 by the manager 12-1 to the trap monitoring node in step S101, then a trap entry demand is issued to the agent 10 in step S102. The trap entry demand causes an issuance of a command message of FIG. 6B. When the agent 10 receives the trap entry demand from the manager 12-1 in step S1, it checks the database 16 in step S2. Since there is a free space in this case, entry is made in step S3 as "Addr1, 2H, aaaa" in the database 16 of FIG. 7. If the entry into the database 16 is successfully made, a trap entry success is issued in step S4. This trap entry success command message causes a return of the command code "TRAP_REG_OK" of FIG. 5 entered as the command of FIG. 6A. Upon the receipt of the trap entry success from the agent 10, the manager 12-1 enters the trap monitor mode of the agent 10 in step S103. The manager 12-2 on the other hand adds the agent 10 to the trap monitoring node in step S201 and then issues a trap entry demand in step S202. This trap entry demand command message causes an issuance of "sequence ID, TRAP_REG_REQ, Addr2, 30 min, bbbb" in conformity with the command format of FIG. 6A. In spite of receipt by the agent 10 of the trap entry demand from the manager 12-2 in step S6, if the database 16 has no free space as in step S7, then all the manager release validation demands entered in the database 16 of FIG. 7 are issued in step S8. Upon the receipt of the message the manager 12-2 returns a time extension demand or a release demand depending on its own status. Afterward, the agent 10 executes the processing of case 1 or case 2 depending on the status of the manager 12-2.

(Case 1):

In the event of the reception of a release demand from the manager or the presence of an unreturn manager, the agent 10 deletes unnecessary traps from the database 16 as in step S9, to form a free space in the database 16. Thus, in step S10, "Addr2, 30 min, bbbb" is entered into the database 16 of FIG. 6. If the entry into the database 16 succeeds, then a trap entry success is issued in step S11. This trap entry success command causes a return of the command "TRAP_REG_OK" of FIG. 5 entered as the command of FIG. 6A. Upon the receipt of the trap entry success from the agent, the manager 12-2 enters the trap monitor mode of the agent 10 in step S204.

(Case 2):

When the time extension demand is received from all the managers, it is difficult to form a free space in the database 16, so that a trap entry demand failure is issued to the manager 12-2 in step S12. This trap entry failure command message causes an issuance of "sequence ID, TRAP_REG_FAILED, Addr2, 30 min, bbbb" in conformity with the command format of FIG. 6A. Upon the receipt of the trap entry failure from the agent 10, the manager 12-2 enters the polling monitor mode of the agent 10.

In the event of the case 2, the manager 12-1 has already entered the trap monitor mode, and hence, upon the occurrence of a trap in the agent 10, the database 16 is referred to in step S13 to issue a trap into the address "Addr1" which is the object of trap. In response to this, the manager 12-1 receives the trap in step S106, to provide a message display, etc. In the event of the case 1, the managers 12-1 and 12-2 enter the trap monitor mode, and hence, upon the occurrence of a trap in the agent 10, the database 16 is referred to in step S14 to issue a trap into the address "Addr1" which is the object of trap. In response to this, the manager 12-1 receives the trap in step S106 to provide a message display, etc. At the same time, in step S15, based on the same trap the agent 10 issues a trap to the address "Addr2" which is the object of trap derived from the database 16. In response to this, the manager 12-2 receives the trap in step S205 to provide a message display.

Figure 9A:
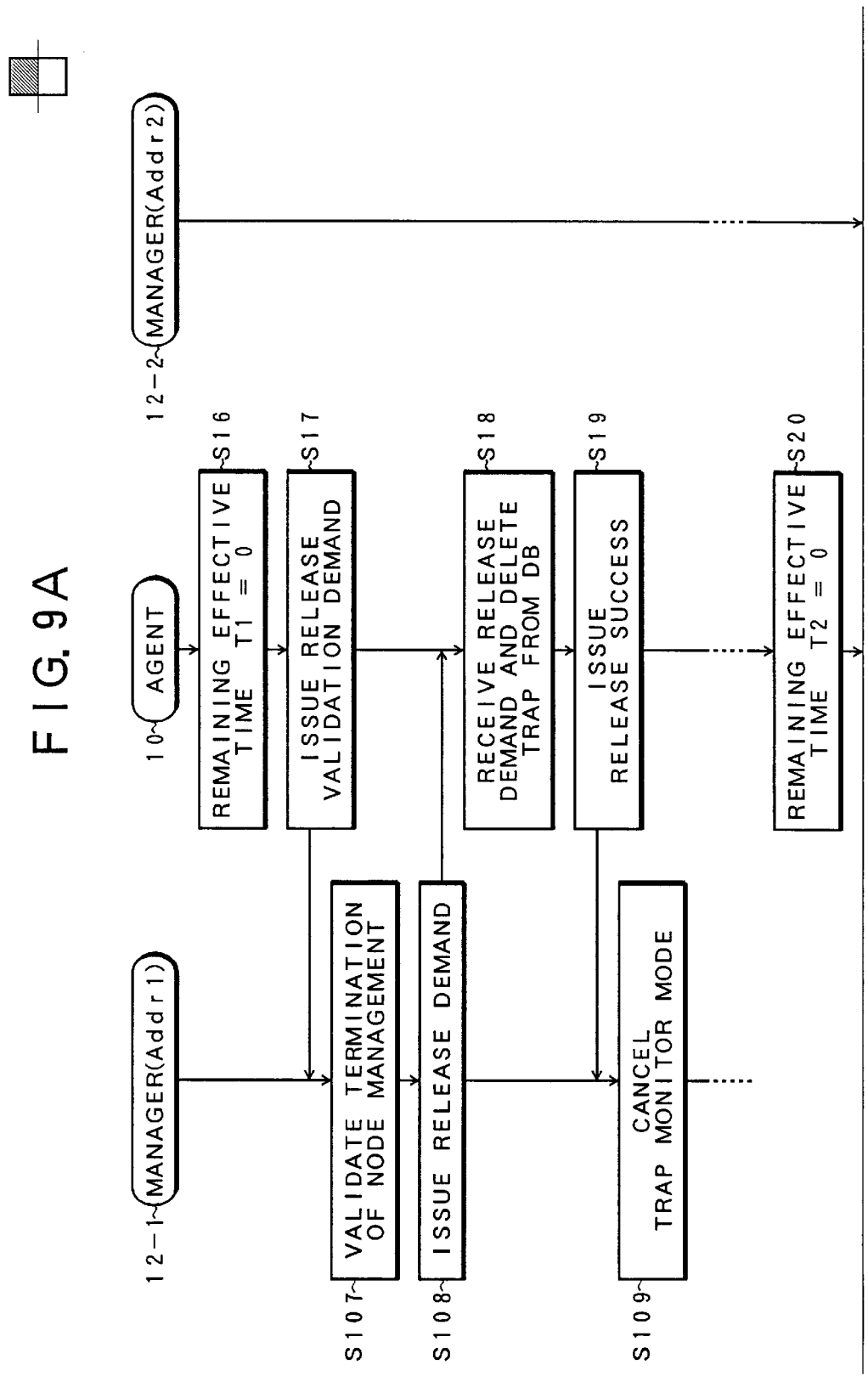

FIGS. 9A and 9B show the processing effected when the respective trap effective times have expired in the agent 10 with the managers 12-1 and 12-2 entering the trap monitor mode. First, when the effective time expires in the agent 10 with the remaining effective time T1=0 of the manager 12-1 in step S16, a release validation demand is issued to the manager 12-1 in step S17. This release validation demand causes an issuance of the command message "sequence ID, TRAP_RELEASE_CONF, Addr1, 0H, aaaa" in conformity with the command format of FIG. 6A. Upon the reception of the release validation demand from the agent 10, the manager 12-1 validates the termination of the agent 10 as the node monitoring target in step S107 and in this case issues a release demand to the agent 10 in step S108. The command format of this release demand is provided in the form of "sequence ID, TRAP_RELEASE_REQ, Addr1, 0H, aaaa". The agent 10 receives the release demand from the manager 12-1 in step S18 to delete the entry as the object of trap from the database 16. After the completion of the deletion, in step S19 a release success is issued to the manager 12-1 in the form of the command message "sequence ID, TRAP_RELEASE_OK, Addr1, 0H, aaaa". In response to the receipt of this release success the manager 12-1 cancels the trap monitoring node for the agent 10 in step S109. If in step S20 of the agent 10 the time-out occurs as a result of the remaining effective time T2=0 in the entry of the object of trap of the manager 12-2, then a release validation demand is issued to the manager 12-2 in step S21. Upon the receipt of the release validation demand from the agent 10, the manager 12-2 validates the succession of the agent 10 as the target of the node monitoring in step S206 and then issues a time extension demand in the form of a command message "sequence ID, TRAP_EXTEND_REQ, Addr2, 30 min, bbbb" in step S207. The agent 10 receives this time extension demand from the manager 12-2 in step S22 to extend the remaining effective time T2 by the demanded time 30 min. A time extension success is issued in step S23 as a command message "sequence ID, TRAP_EXTEND_OK, Addr2, 30 min, bbbb". In response to this time extension success the manager 12-2 continues the trap monitor mode in step S208. Assume that thereafter the manager 12-2 comes to a halt due to failures, etc., in step S209. Further assume that with the manager 12-2 halted, the agent 10 recognizes the time-out of the remaining effective time T2=0 of the manager 12-2 in step S24 and issues a release validation demand. In spite of this issuance of the release validation demand, there is no response obtained due to the manager 12-2 being in its halted state. Thus, if the agent 10 judges the time-out of the response wait in step S25, then it deletes the entry of the object of trap of the manager 12-2 from the database 16 in step S26. In cases where no response is thereby obtained as a result of the down of the manager whose trap effective time has expired, the entry of object of trap is automatically deleted on the side of the agent so that no trap is issued to the expired responseless manager and that unnecessary memory resources are not occupied due to the deletion from the database in the agent 10.

FIG. 10 is a timing chart for causing the agent 10 to escape from the trap monitor mode by the manager 12-1. In step S110 the manager 12-1 issues a release demand to the agent 10. In response to this release demand, the agent 10 deletes the entry of the manager 12-1 as the objet of trap from the database 16 in step S27. When the entry of the object of trap is successfully deleted, a release success is issued to the manager 12-1 in step S28. As a result, the manager 12-1 cancels the trap monitor mode for the agent 10 in step S112.

Figure 11:
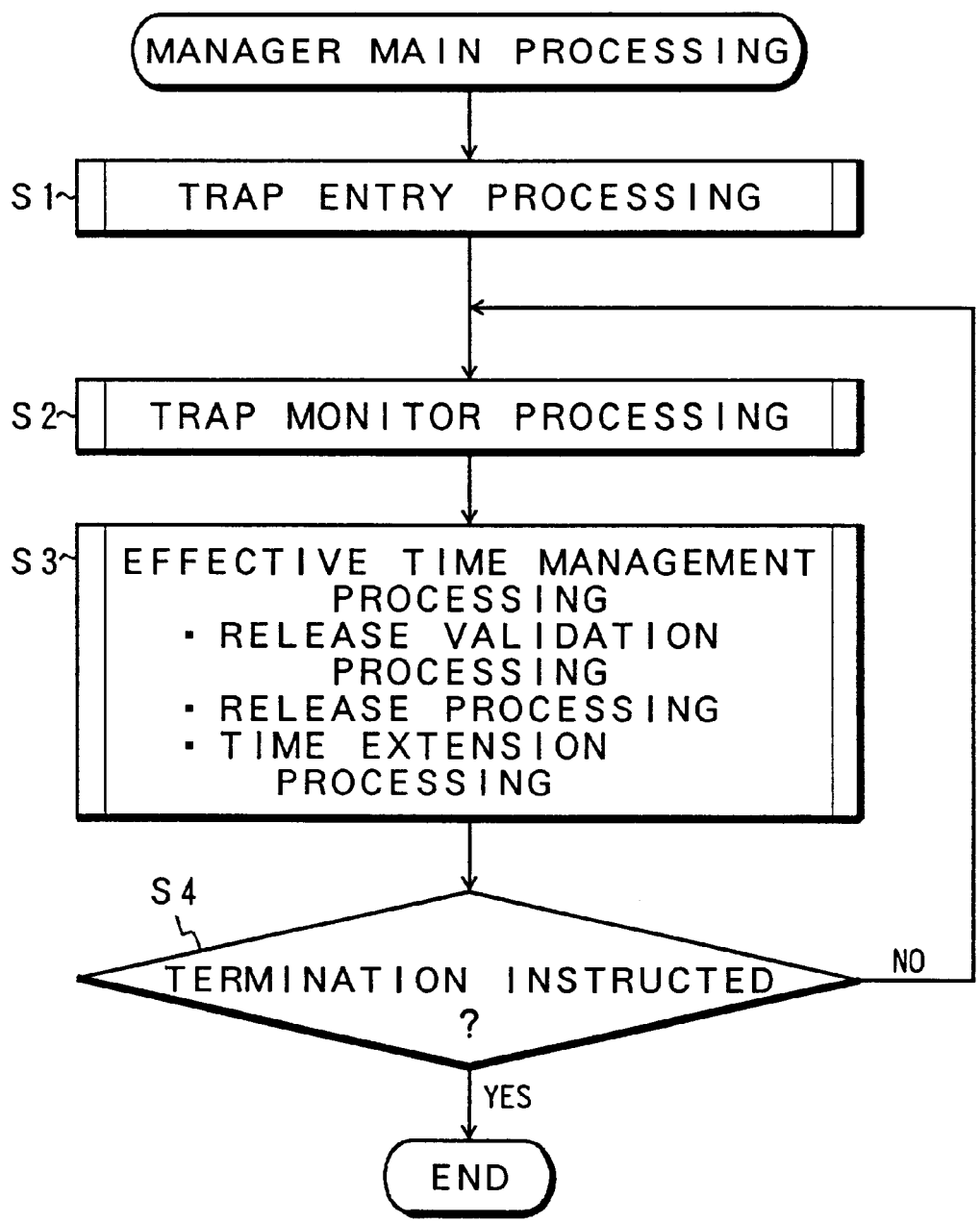
FIG. 11 is a flowchart of the main processing of the manager of FIG. 4.

FIG. 11 is a flowchart of the main processing effected in the manager 12-1 of FIG. 3. In the manager main processing, if any node is added as the target of monitoring then the entry demand processing is carried out in step S1, and trap monitor processing from the agent is performed in step S2. Furthermore, the effective time management processing corresponding to the release validation demand from the agent is performed in step S3, and the main processings of steps S2 and S3 are iterated till the issuance of instruction of termination in step S4.

Figure 12:
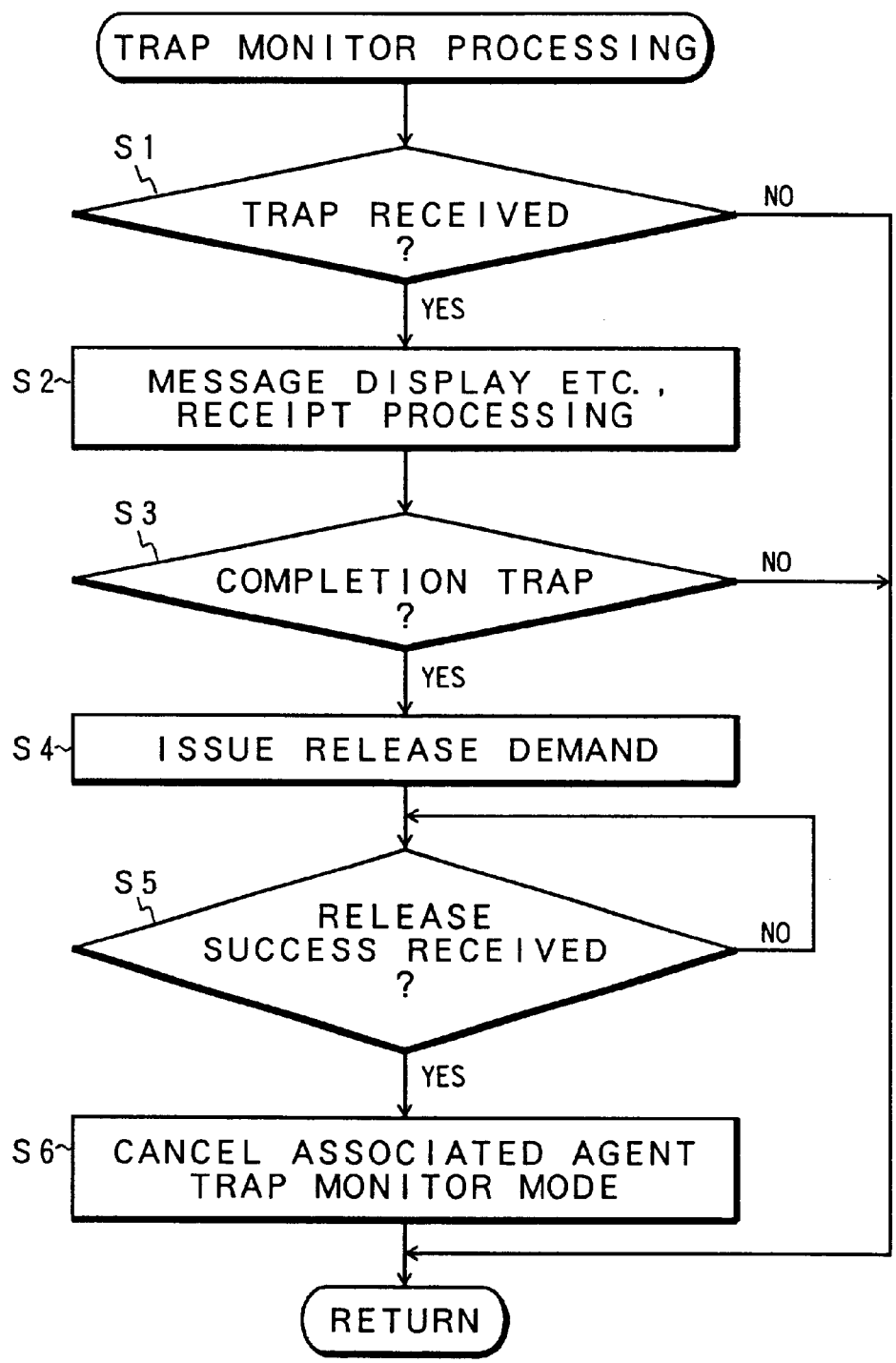
FIG. 12 is a flowchart of the trap monitor processing of FIG. 11.

FIG. 12 is a flowchart of the trap monitor processing in step S2 of FIG. 11. In the trap monitor processing, a check is made of the trap reception from the agent in step S1, and if any trap is received, then trap reception processing such as message display, etc., is carried out in step S2. Then in step S3 a check is made to see if the received trap is a completion trap or not. If affirmative, then a release demand is issued to the agent in step S4, and the reception of the release success is waited for in step S5, and the trap monitor mode for that agent is cancelled in step S6.

Figure 13:
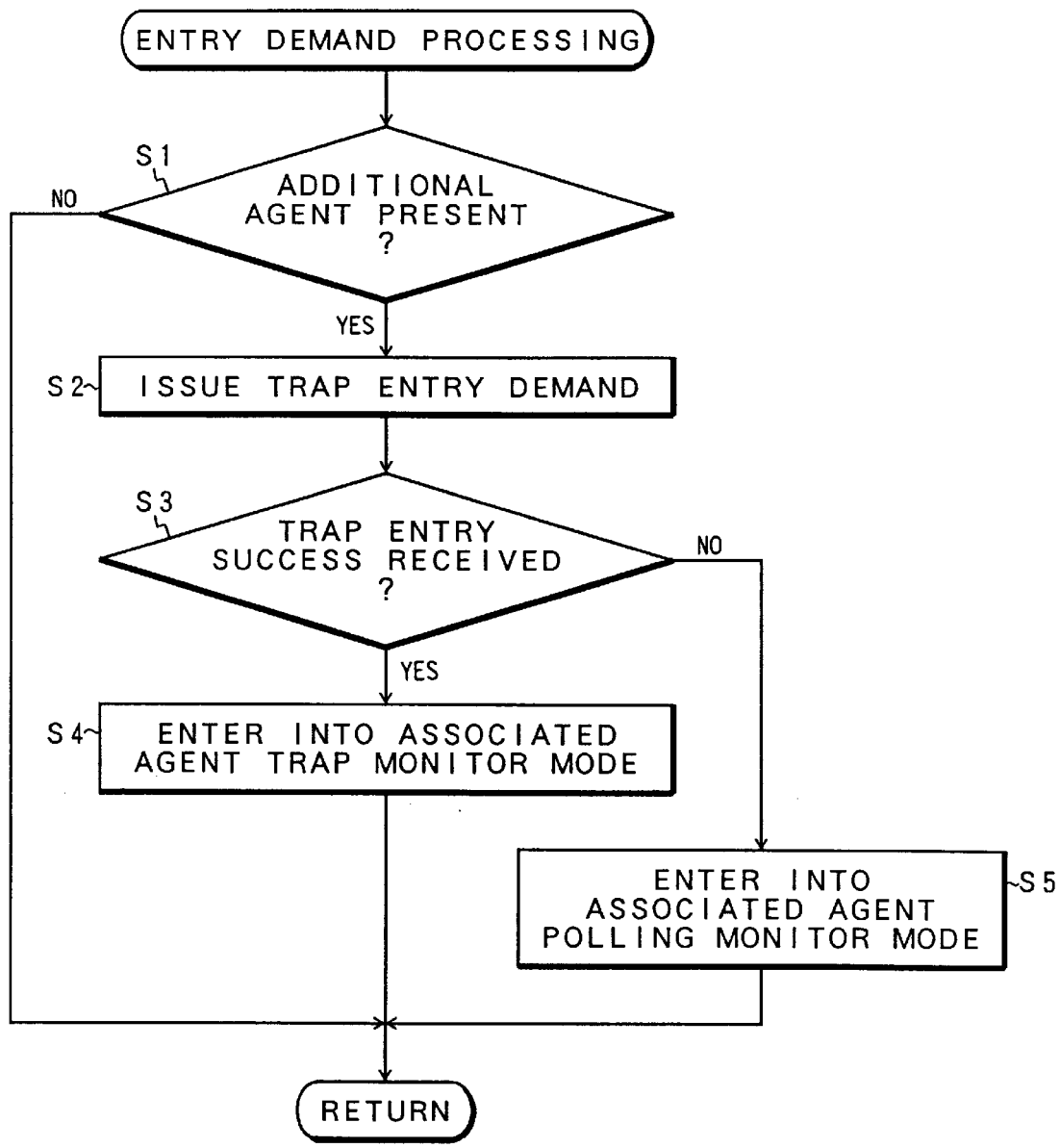
FIG. 13 is a flowchart of the trap entry demand processing of FIG. 11.

FIG. 13 is a flowchart of the entry demand processing effected in step S2 of FIG. 11. When the manager recognizes the addition of the agent in step S1, a trap entry demand is issued to an agent as the object of addition in step S2. A check is then made of the reception of the trap entry success in step S3, and if the success is received, then it enters the trap monitor mode for that newly added agent in step S4. In the event of the trap entry failure, it enters polling monitor mode for that newly added agent in step S5.

Figure 14:
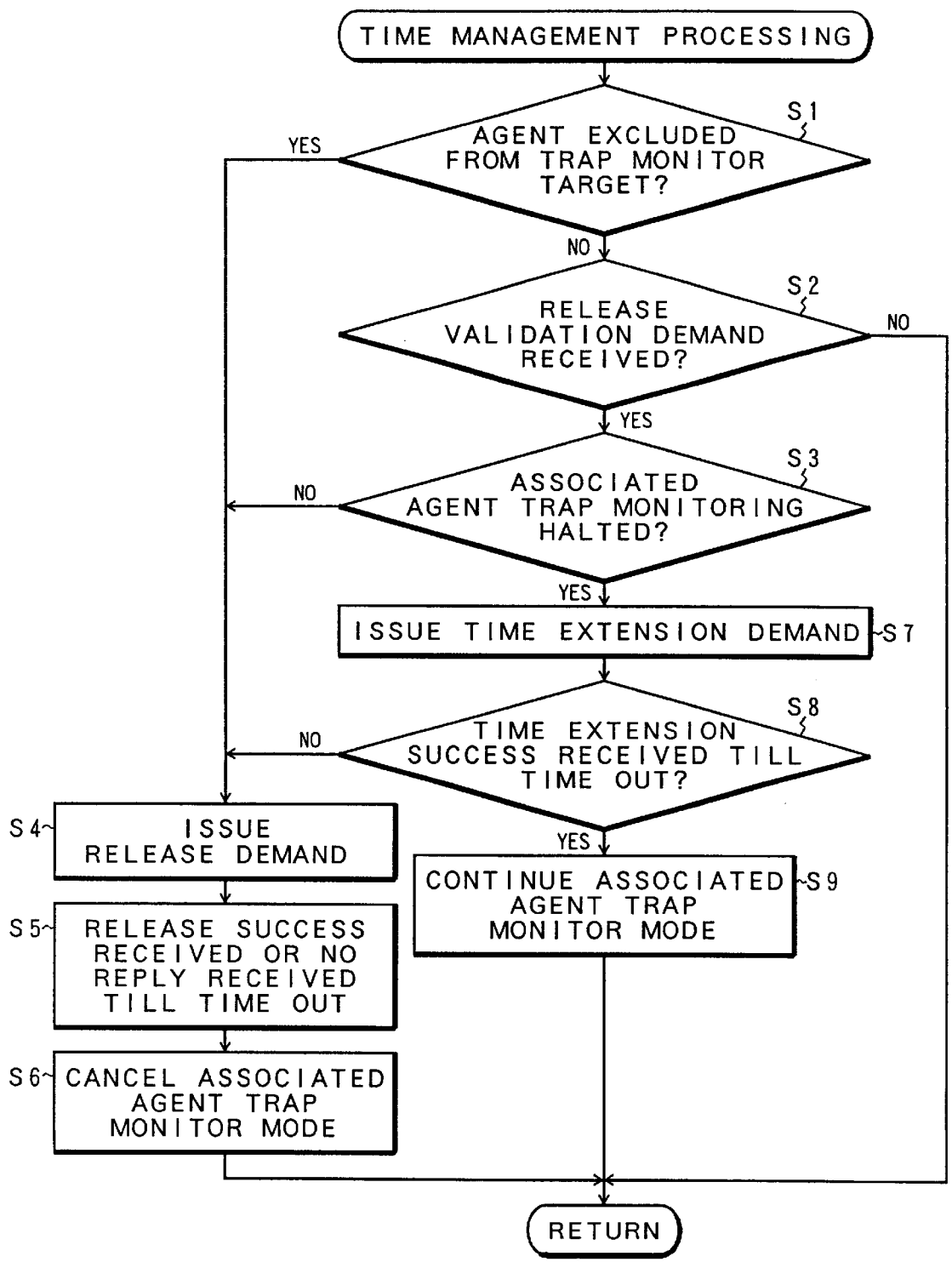
FIG. 14 is a flowchart of the effective time management processing of FIG. 11.

FIG. 14 is a flowchart of the effective time monitor processing effected in step S3 of FIG. 11. In this effective time monitoring processing, a check is made in step S1 to see if the agent is to be excluded from the target of trap monitoring, and if negative, then a check is made in step S2 of the reception of the release validation demand issued correspondingly to the trap effective time time-out from the agent. If the release validation demand is received, then a check is made to see if the trap monitoring is to be halted or not of the target equipment in the agent causing the issuance of the release validation demand. In the event of halt of the succession of the trap monitoring, the procedure advances to step S4 to issue a release demand to the agent. If in response to the issuance of the release demand a release success is received from the agent or the time-out occurs in step S5, the trap monitor mode for that agent is cancelled in step S6. Similarly, in the event of exclusion of the agent from the trap monitoring target in step S1, the processings of steps S3 to S5 are carried out. On the contrary, in the case of the succession of the monitoring of the target equipment of the agent to which the release validation demand has been issued in step S3, the procedure goes to step S7 to issue the time extension demand to the agent. If the time extension success from the agent is received before the time-out in step S8, then the trap monitoring mode for that agent is continued in step S9.

Figure 15:
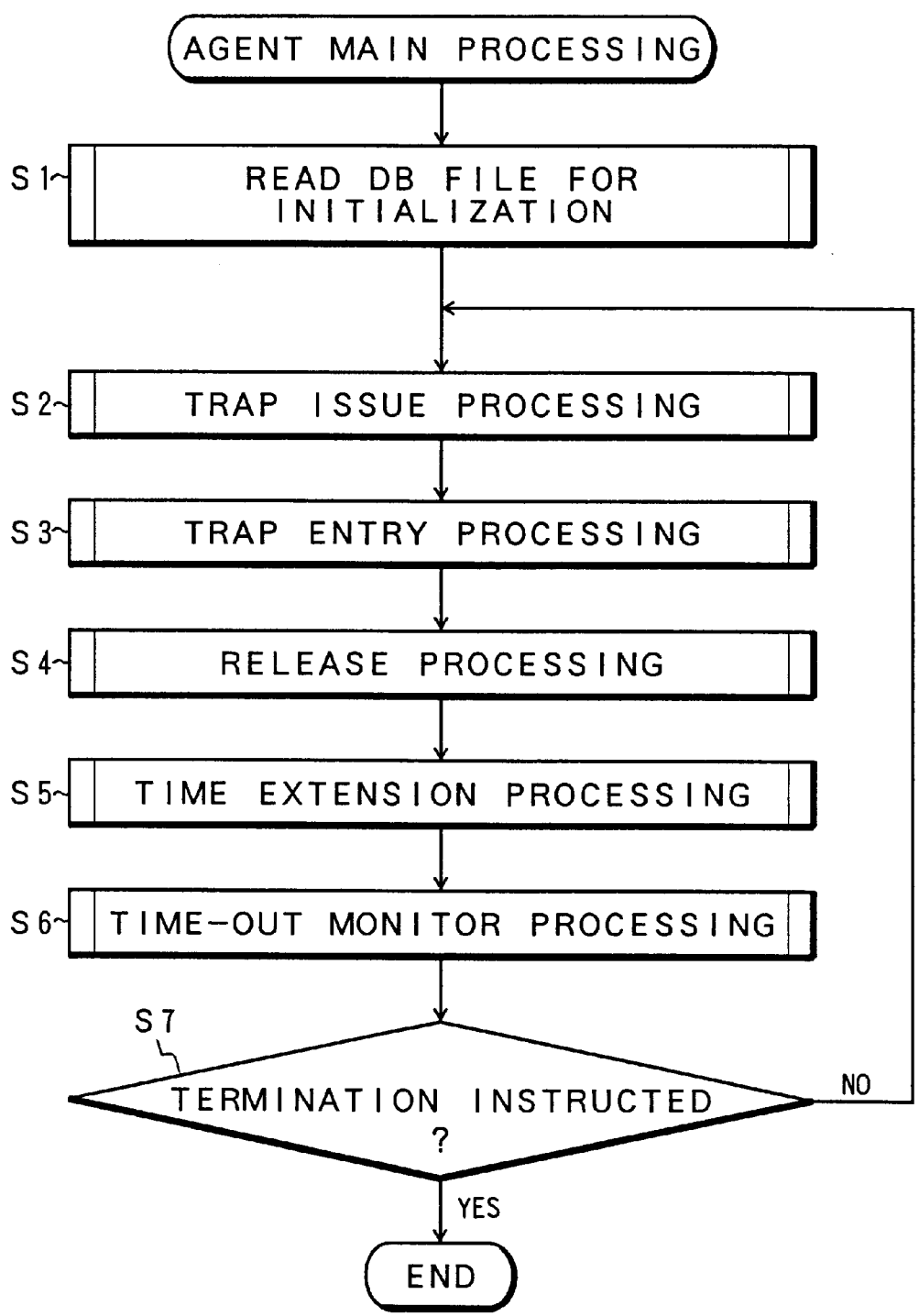
FIG. 15 is a flowchart of the main processing of the agent of FIG. 4.

FIG. 15 is a flowchart of the main processing effected in the agent 10 of FIG. 4. In this agent main processing, a database file read is performed for initialization attendant on the activation of the agent in step S1, and the trap issuance processing is carried out in step S2. The trap entry processing is performed in step S3 which is followed by the release processing in step S4, the time extension processing in step S5, and the time-out monitoring processing in step S6. The processings of steps S2 to S6 are iterated till the issuance of instruction of termination in step S7.

Figure 16:
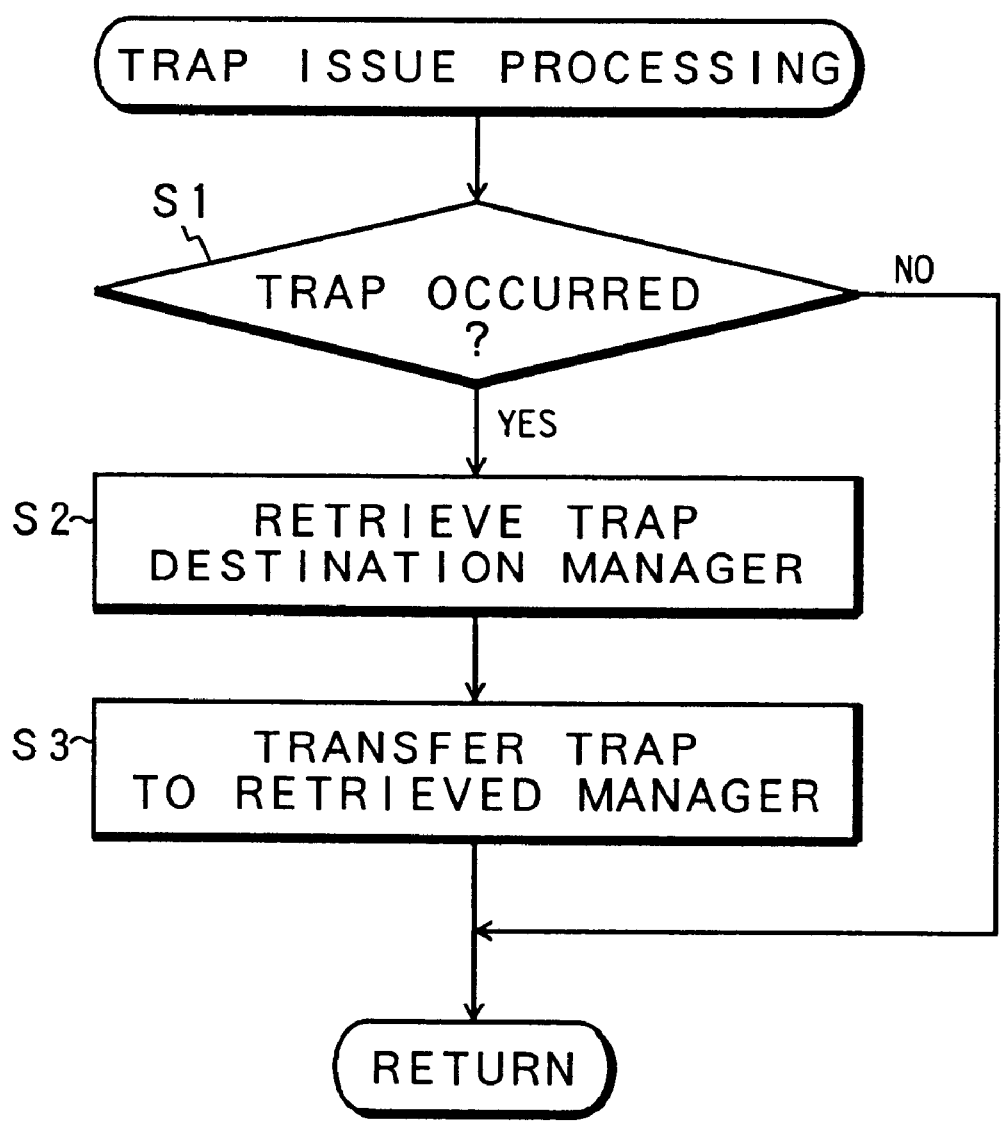
FIG. 16 is a flowchart of the trap issuance processing of FIG. 15.

FIG. 16 is a flowchart of the trap issuance processing of FIG. 15. In this trap issuance processing a check is made in step S1 to see if any trap has occurred in the target equipment, and if affirmative, the procedure goes to step S2 to retrieve the trap destination manager from the database. The trap is then transferred to the thus retrieved manager in step S3.

Figure 17:
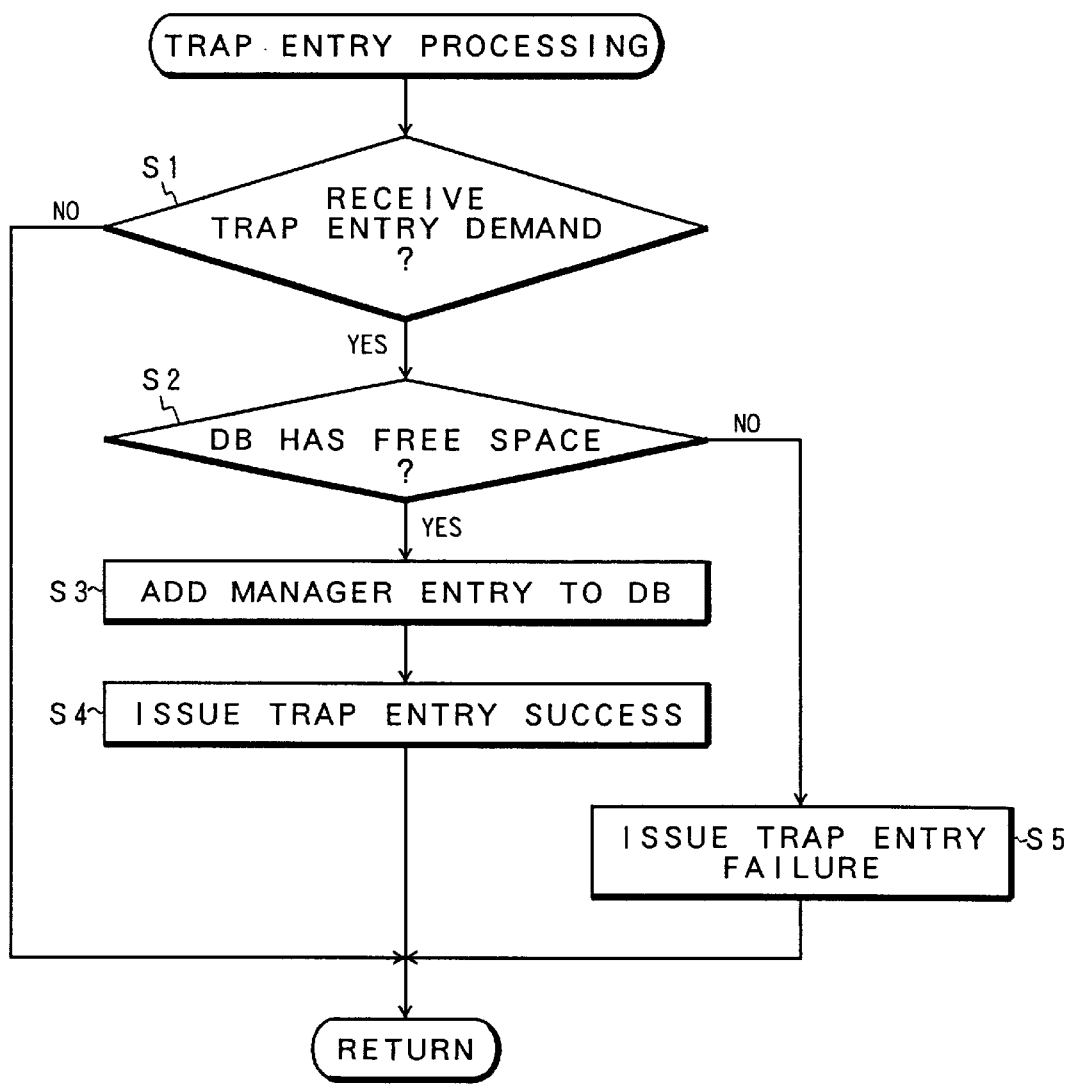
FIG. 17 is a flowchart of the trap entry processing of FIG. 15.

FIG. 17 is a flowchart of the trap entry processing of FIG. 15. In this trap entry processing, when a trap entry demand is received from the manager in step S1, then the procedure goes to step S2 to make a check to see if the database has any free space. If affirmative, addition is made in step S3 of the entries associated with the manager, such as the object of trap, the remaining effective time, and the authentication ID as shown in FIG. 6. A trap entry success is then issued to the manager in step S4. On the contrary, if the database has no free space in step S2, then a trap entry failure is issued to the manager in step S5.

Figure 18:
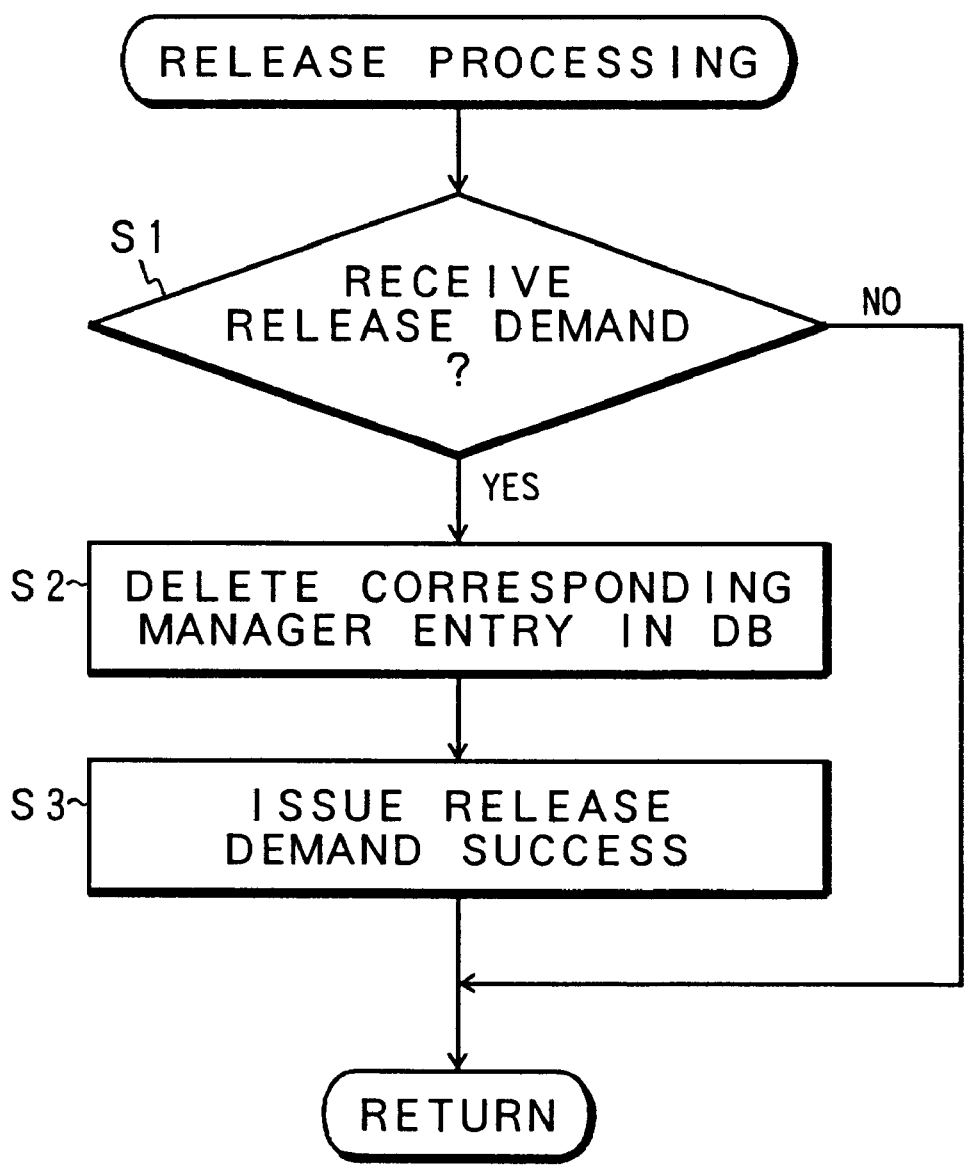
FIG. 18 is a flowchart of the release processing of FIG. 15.

FIG. 18 is a flowchart of the release processing effected in step S4 of FIG. 15. In this release processing, the receipt of the release demand is judged in step S1, and then the procedure goes to step S2 to delete the entry of the corresponding manager in the database. After the completion of the delete of the entry, a release demand success is issued to the demander manager in step S3.

Figure 19:
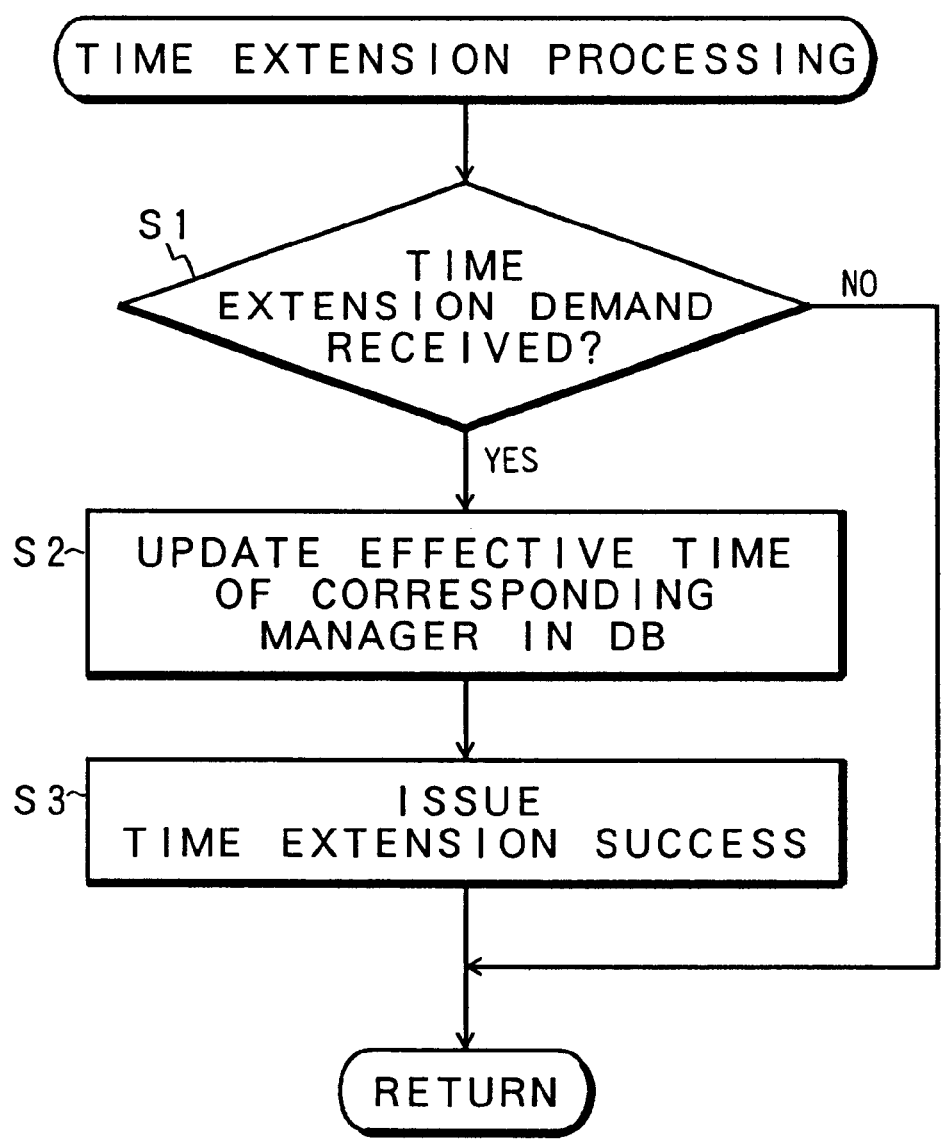
FIG. 19 is a flowchart of the time extension processing of FIG. 15.

FIG. 19 is a flowchart of the time extension processing effected in step S4 of FIG. 15. In this time extension processing, when the time extension demand is received from the manager in step S1, the procedure goes to step S2 to update the effective time of the corresponding manager in the database. After the completion of the update, a time extension success is issued to the demander manager in step S3.

Figure 20:
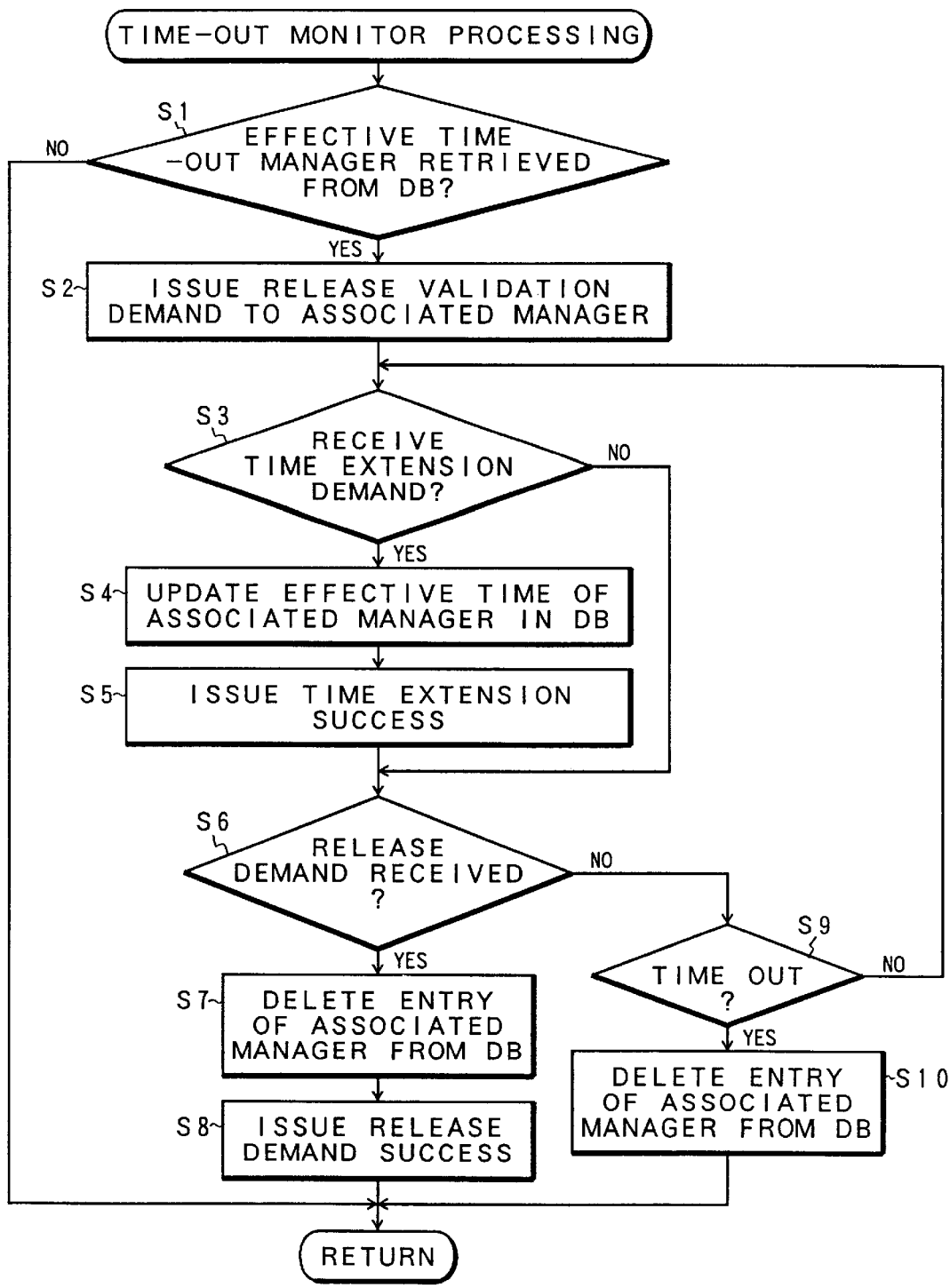
FIG. 20 is a flowchart of the timeout monitor processing of FIG. 15.

FIG. 20 is a flowchart of the time-out monitoring processing effected in step S5 of FIG. 15. In this time-out monitoring processing, a retrieval is made in step S1 of whether in the database there is a manager as the object of trap whose effective time has expired. When the time-out is retrieved, the procedure goes to step S2 to issue a release validation demand to the corresponding manager as the object of trap which has expired. After the completion of issuance of the release validation demand, it is judged in step S3 whether the time extension demand has been received or not. If affirmative, the effective time is updated in step S4 of the corresponding manager in the database and a time extension success is issued in step S5. The processings of the steps S3 to S5 are the time extension processing itself shown in FIG. 18. In the event of receipt of the release demand in step S6, the entry of that manager is deleted from the database in step S7, and a release demand success is issued in step S8. The processings of the steps S6 to S8 are the same as the release processing of FIG. 18. On the contrary, in case after the issuance of the release validation demand to the corresponding manager in step S2, no time extension demand is received in step S3 with no receipt of the release demand in step S6, the procedure goes to step S9 to make a time-out check of whether a certain response time has elapsed. When the time-out results after the elapse of a certain period of time, the procedure goes to step S10 to compulsorily delete the entry of that manager which has expired from the database.

Description will then be made of a specific example of the trap control system of the present invention by way of a printer as the target equipment for monitoring. FIG. 21 shows a system configuration of the trap control system of the present invention, in which hosts 12A and 12B and a printer 11 are connected to a LAN 14 providing a subnet. The hosts 12A and 12B are managers in the SNMP network management protocol, and the printer 11 is an agent which is therefore equipped with the database 16 for storing the objects of trap.

Figure 22A:
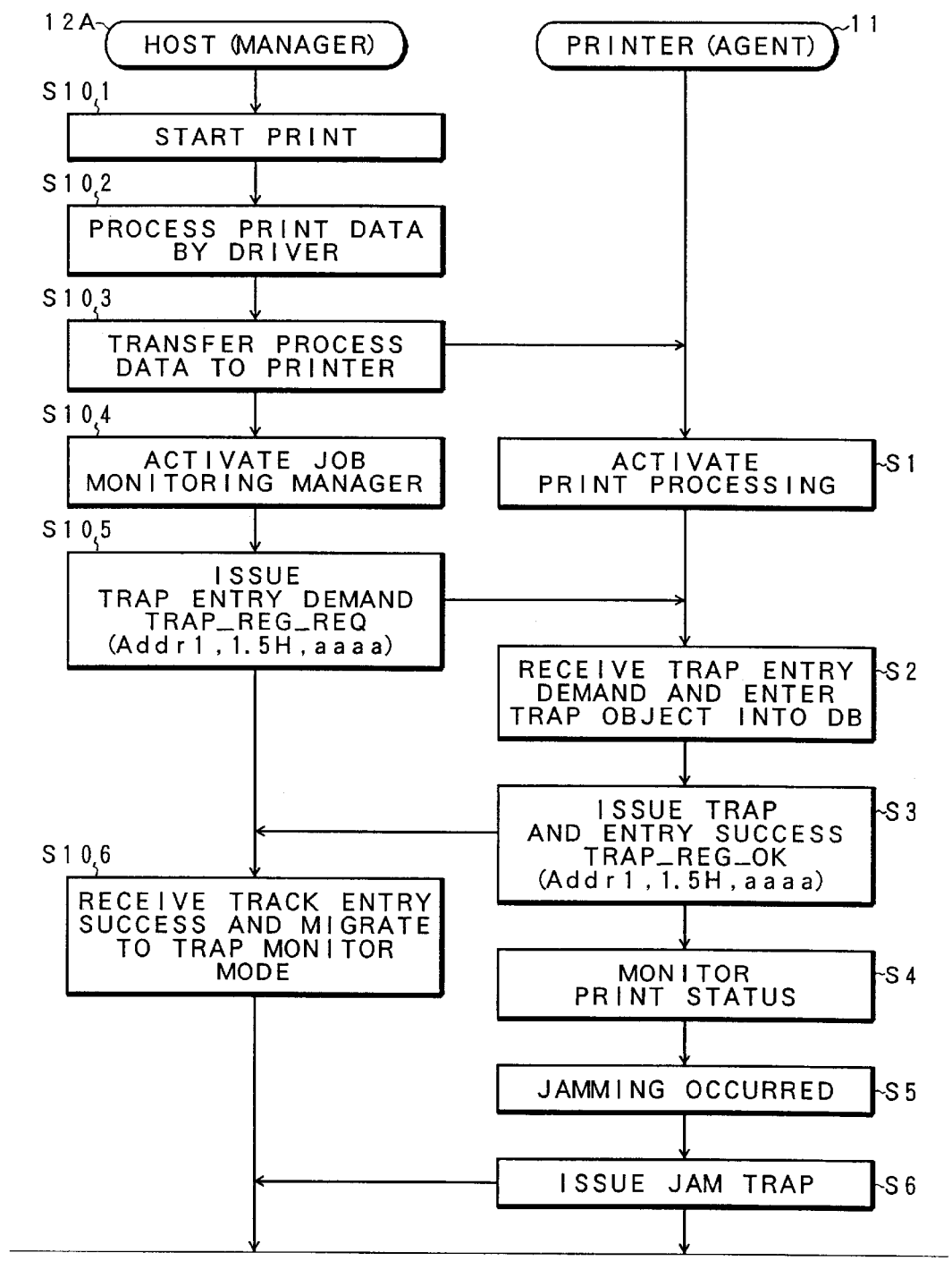
FIGS. 22A and 22B are timing charts of the trap control provided by the host-side manager and the printer-side agent of FIG. 21.
Figure 22B:
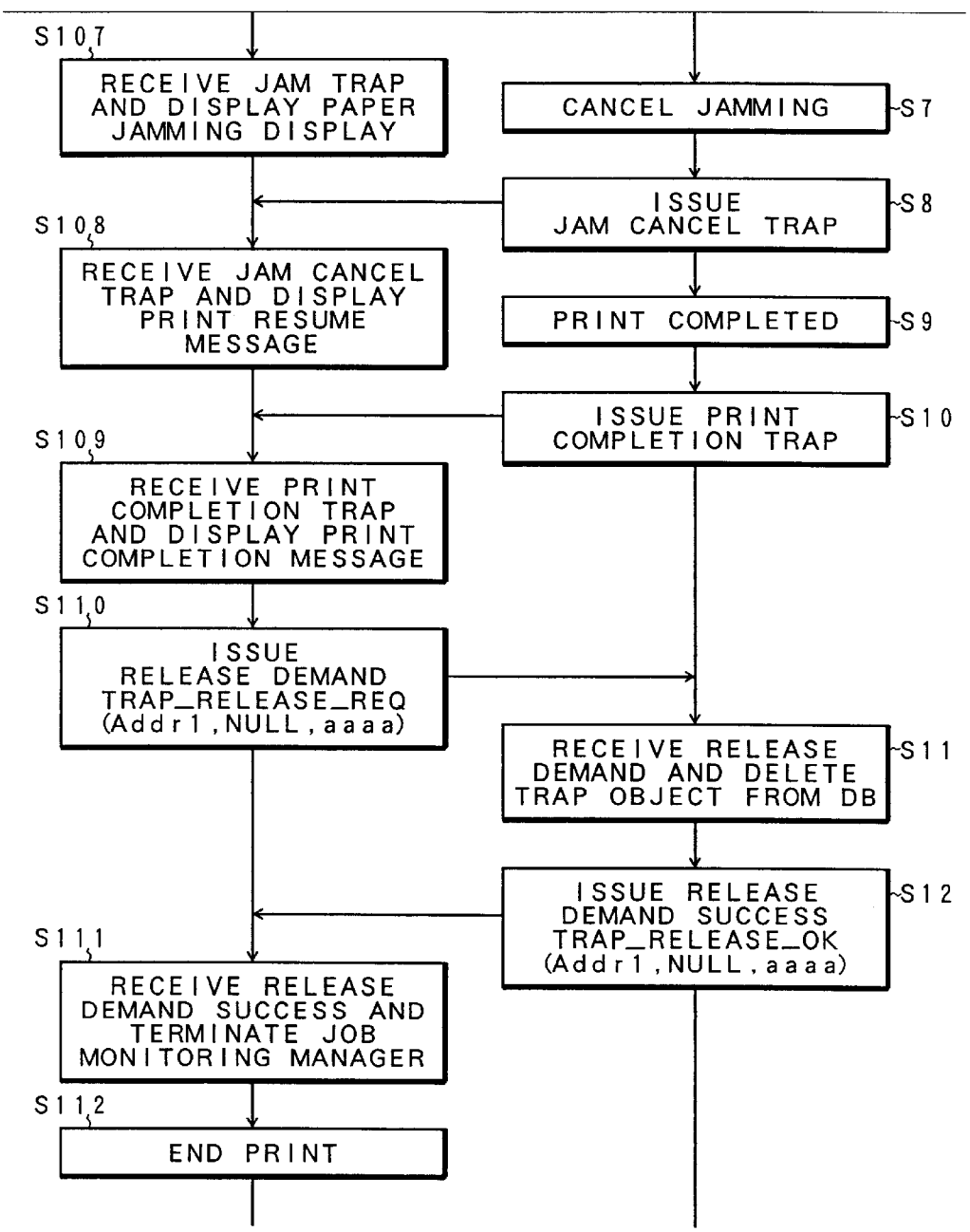
Figure 23A:
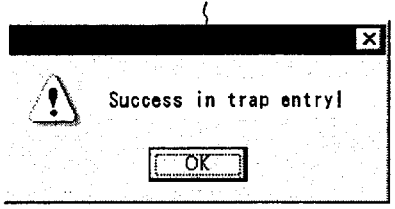
FIGS. 23A to 23E are explanatory diagrams of diagramming logs for use in message displays of the trap control of FIGS. 22A and 22B.
Figure 23B:
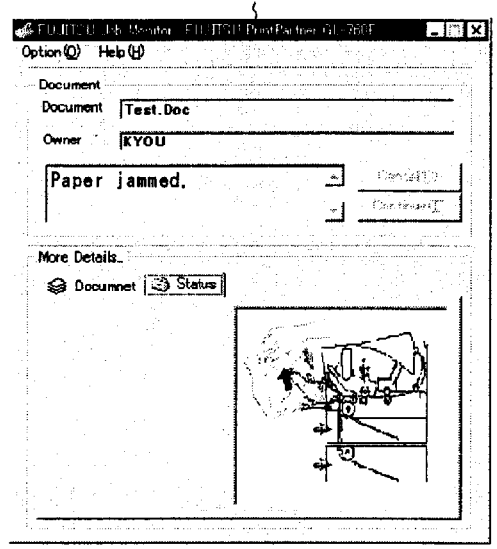
Figure 23C:
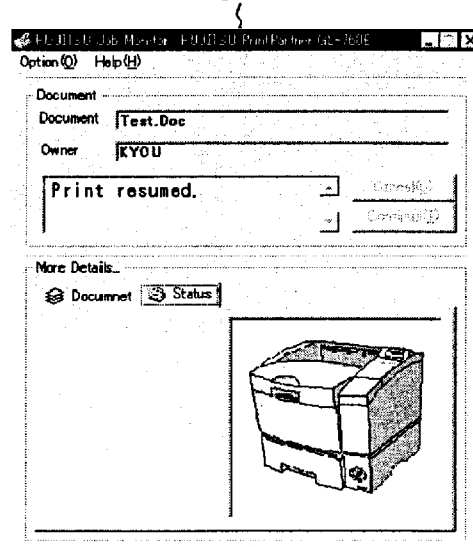
Figure 23D:
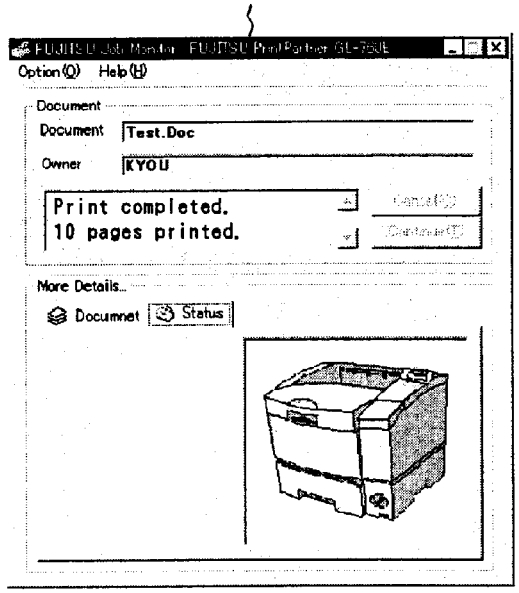
Figure 23E:
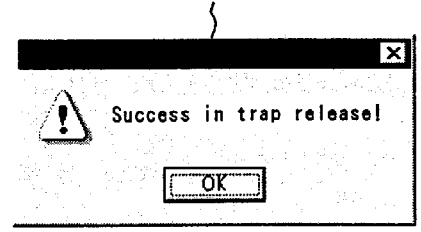

FIGS. 22A and 22B are timing charts of the trap control processing effected by the present invention when the host 12A of FIG. 21 makes a print demand to the printer 11. The host 12A commences the print processing in step S101, processes print data by the driver in step S102 and thereafter transfers the print data to the printer in step S103. After the completion of the transfer of the print data to the printer, a job monitor manager is activated in step S104 and a trap entry demand is issued to the printer 11 in step S105. The printer 11 receives the print data from the host 12A in step S1 to activate the print processing. The trap entry demand is then received from the host 12A in step S2 to perform the entry processing of the objects of trap into the database 16. A trap entry success is then issued to the host 12A in step S3. The host 12A receives the trap entry success in step S106 for the migration to the trap monitor mode. At that time, the host 12A provides a display of a trap entry success log 46 as shown in FIG. 23A for example. In step S4 the printer 11 monitors the status of print and, if e.g., a jam occurs during the printing operation in step S5, retrieves the database in step S6 to recognize the host 12A as the object of trap to thereby issue a jam trap to the host 12. The host 12A receives the jam trap from the printer 11 in step S107 to provide a message display of paper jam. This message display indicates the site of occurrence of the jam by the internal structure of the printer 11 simultaneously with a message display "Paper jammed" as in a jam occurrence log 48 of FIG. 23B for example. Against the jam occurrence, the printer 11 performs the jam cancellation by the operator in step S7, and then a jam cancel trap is issued to the host 12A in step SB. The host 12A receives the jam cancel trap in step S108 to provide a print resume message display. This print resume message display provides a jam cancel log 50 as shown in FIG. 23C for example. Then, upon the print completion in step S9 on the printer 11 side, a print completion trap is issued to the host 12A in step S10. The host 12A receives the print completion trap in step S109 to provide a print completion message display. This print completion message display provides a print completion log 52 as shown in FIG. 23D for example. Then in step S110 the host 12 issues a release demand to the printer 11 on the basis of receipt of the print completion trap. The printer 11 receives the release demand from the host 12 in step S11 to delete the entry of the host as the object of trap from the database. After the completion of deletion of the object of trap, a release demand success is issued to the host 12 in step S12. The host 12 receives the release demand success from the printer 11 in step S111 to terminate the job monitoring manager, and brings a series of print processes to an end in step S112. When the host 12 receives the release demand success in step S111, a release demand success log 54 is displayed as shown in FIG. 23E for example.

FIG. 24 shows another embodiment of a trap control system of the present invention, which is characterized by the provision of a representative agent on the agent side.

To LAN 14 providing a subnet are connected managers 12-1, 12-2, agents 10A to 10C, and further in this embodiment a representative agent 15. The agent 10A to 10C are equipment unable to provide a service for the trap control shown in the agent 10 of FIG. 4 due to the restriction by themselves. For example, the memory area may run short for functioning as the agent 10 of FIG. 4, or database may not be secured due to the restriction in the memory area. In the event that the agents 10A to 10C are not able to effect the function of the agent 10 of FIG. 4 in this manner, the representative agent 15 is provided so that the function of the agent 10 of FIG. 4 is executed by the representative agent 15. To this end, the representative agent 15 includes databases 16-1 to 16-3 which are secured correspondingly to the agents 10A to 10C, respectively.

Figure 25A:
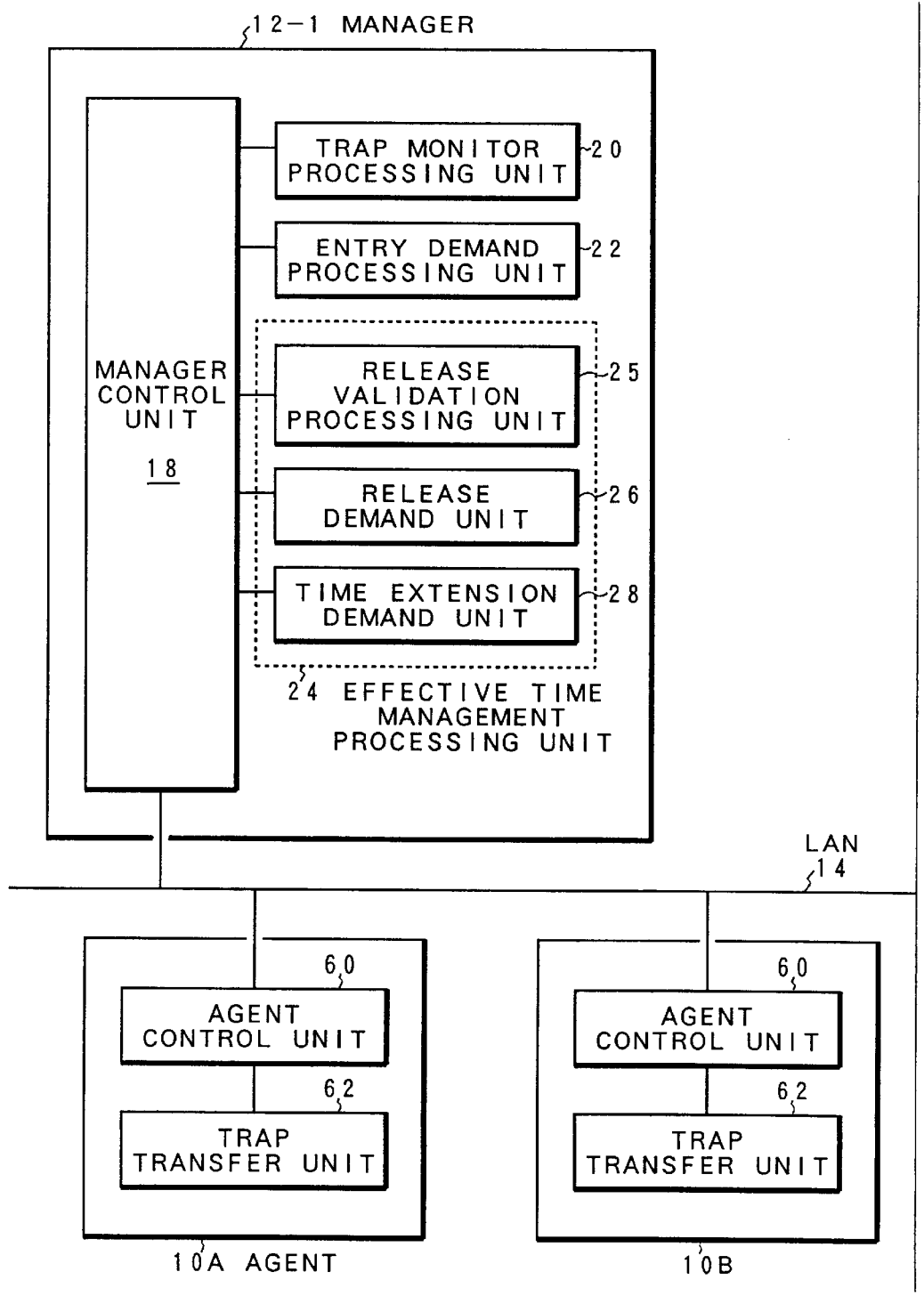
FIGS. 25A and 25B are function block diagrams of the manager, the representative agent and the agent of FIG. 24.
Figure 25B:
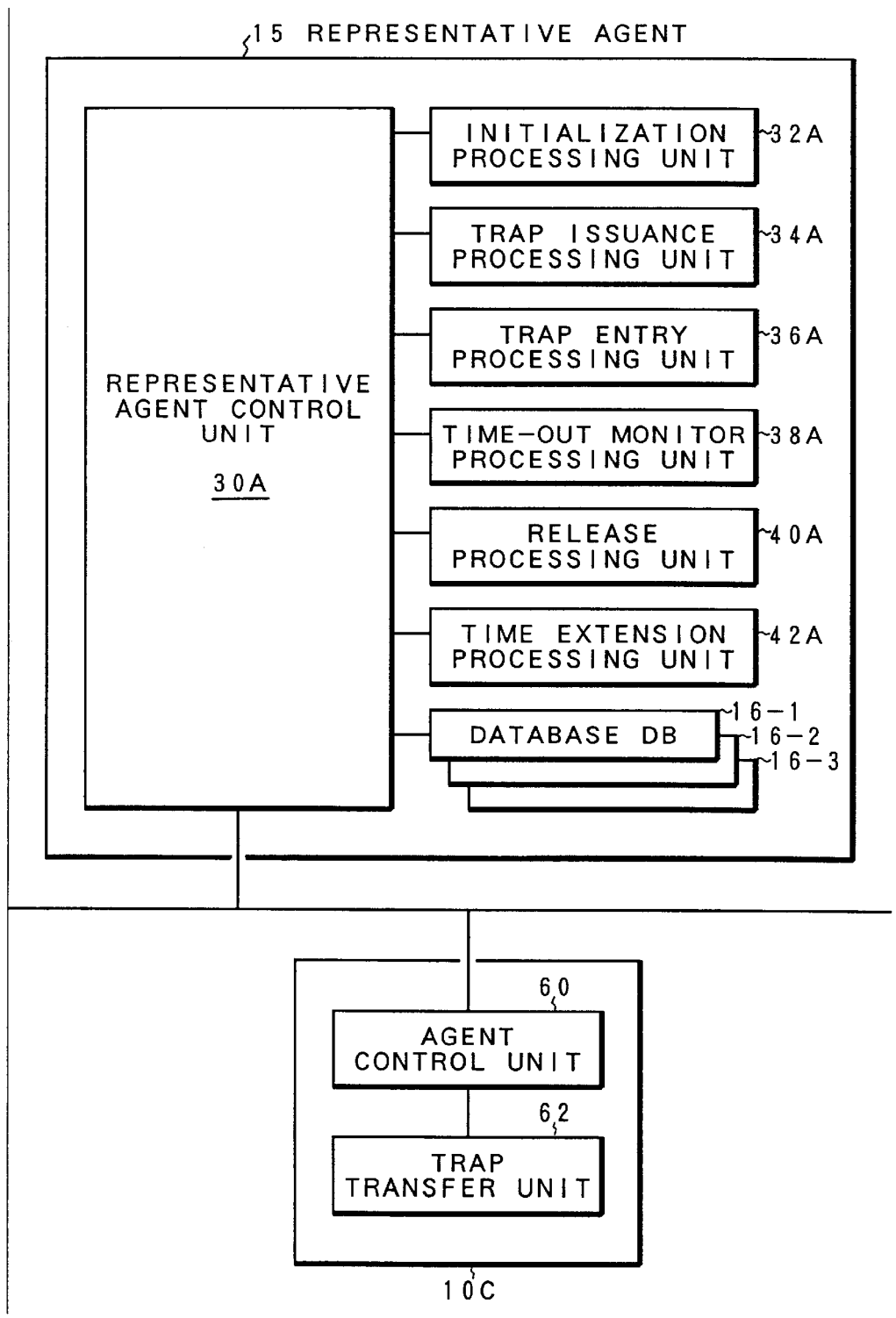
Figures 26A, 26B, 27:
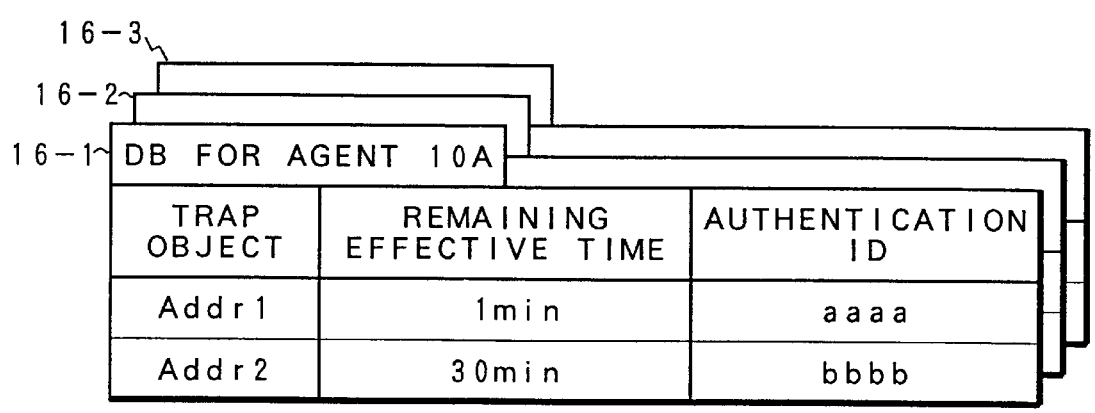
FIGS. 26A and 26B are explanatory diagrams of a command format for use in the system of FIG. 24.
FIG. 27 is an explanatory diagram of a database provided in the representative agent of FIG. 24.

FIGS. 25A and 25B are block diagrams of a function configuration of the manager 12-1, the representative agent 15, and further the agents 10A to 10C in the embodiment of FIG. 24. First, the manager 12-1 is the same as the manager 12-1 of the FIG. 4 embodiment, which comprises a manager control unit 18, a trap monitor processing unit 20, an entry demand processing unit 22 and an effective time management processing unit 24 which includes a release validation processing unit 25, a release demand unit 26 and a time extension demand unit 28. On the other hand, the representative agent 15 has basically the same configuration as the FIG. 3 embodiment agent 10 but has databases 16-1 to 16-3 corresponding to the agents 10A to 10C, respectively. Another difference lies in that the representative agent 15 comprises a trap issuance processing unit 34A which receives a trap issuance from a trap transfer unit 62 and an agent control unit 60 provided in the agents 10A to 10C and which based thereon retrieves the corresponding databases 16-1 to 16-3 to recognize the manager as the object of trap to thereby issue a trap. For the other units, i.e., a trap entry processing unit 36A, a time-out monitor processing unit 38A, a release processing unit 40A and a time extension processing unit 42A, difference merely lies in the database retrieval processing in which the database is provided for each of the agents in the FIG. 4 embodiment whereas the representative agent 15 includes the databases 16-1 to 16-3. In the command messages for demand and response between the manager 12-1 and the representative agent 15, an agent address is newly provided in addition to the sequence ID, the command, the object of trap, the effective time and the authentication ID as shown in FIG. 26A. FIG. 26B shows a command message for making a trap entry demand for the agent 10A from the manager 12-1 to the representative agent 15. This command message differs from that of FIG. 3 embodiment in that the former includes the agent address "Addr11" of the agent 10A placed in the last line. By virtue of the placement of the agent address in the command message, the representative agent 15 is capable of recognizing to which of the agents 10A to 10C represented by the agent 15 the trap entry demand is made.

FIG. 27 shows the databases 16-1 to 16-3 which are provided in the representative agent 15 so as to correspond to the agents 10A, 10B and 10C, respectively. The databases 16-1 to 16-3 each have the object of trap, the remaining effective time and the authentication ID, as in the database 16-1 of the agent 10A, and in this case, the remaining effective time and the authentication ID are entered with the managers 12-1 and 12-2 as the object of trap as in FIG. 24. In this respect, the same applies to the databases 16-2 and 16-3 corresponding to the managers 10B and 10C. In such a FIG. 24 embodiment, it is easy to secure the databases 16-1 to 16-3 due to the use of a computer or the like as the representative agent 15. The provision of the representative agent 15 enables the problem of the shortage of resources in the agents 10A to 10C to be solved. Through the interchange of the demands and the responses relative to the managers 12-1 and 12-2, entries as the objects of trap are performed on the demand from the manager side for each of the agents 10A to 10C. When the representative agent 15 is posted on the trap in case of occurrence of the trap in the agents 10A to 10C, the representative agent 15 can refer to the corresponding databases 16-1 to 16-3 to recognize the object of trap to issue a trap to the thus recognized object of trap.

As discussed hereinabove, according to the present invention, it is possible to control whether the manager side is to receive the trap of the agent by entering the object of trap from the manager into the agent and therefore to prevent any occurrence of vain trap.

Furthermore, the present invention allows a unicast trap to be issued from the agent on the basis of the entry of the object of trap from the manager, whereby it is possible to reduce the amount of traffic in the network as compared with the broadcast trap and further even for the manager outside the subnet to receive the traps by providing the unicast trap against the broadcast trap restricted in the subnet.

It is also possible to automatically perform the operations such as trap entry, deletion, etc., without operators, by the protocols on the trap processings between the managers and the agents, thereby relieving the burden on the operators, and to secure the correctness in the entry of the object of trap.

It is also possible for the manager side to control the trap effective time for each agent. Upon the time-out of the trap effective time there is made a validation for the manager so that the effective time can be controlled by the instruction of release or extension from the manager on the basis of the validation, thereby allowing effective utilization of the agent resources and reducing the vain traps.

Furthermore, the agent side is given as the threshold values the maximum effective time and the minimum effective time of the trap effective time. Thus, in the event that the trap effective time from the manager exceeds the maximum effective time, coincidence with the maximum effective time is made, whereas in the event that it is shorter than the minimum effective time, coincidence with the minimum effective time is made, thereby preventing any occurrence of unnecessary traps due to too long trap effective time as well as to prevent the increase in the number of times of issuance of the trap entry demand or the trap time extension demand due to too short trap effective time.

Furthermore, the trap function of the NNMP used as the network management protocol may merely be extended without altering the protocol itself, so as not to influence the merits such as the versatility, standardization, light weight.

Although the above embodiments have been described by way of the example of the SNMP as the network management protocol, they are applicable intactly to the any appropriate network management protocols as long as the protocols employ the broadcast system and the unicast system for the trap management.

Although in the above embodiments a specific example has been the case where the print data are fed for print processing from the host to the personal computer, the equipment to be trap monitored can include any appropriate network connection equipment such as personal computers or workstations, without being limited to the printers. It will be appreciated that the prevent invention includes any appropriate variants without impairing the objects and advantages and that it is not restricted by the numerical values indicated in the embodiments.

What is claimed is:

1. A trap control system including a manager and an agent which are connected via a network to each other, said agent issuing a trap to said manager for monitoring, said manager comprising:
an entry demand processing unit issuing a trap entry demand containing a self-address and trap effective time to an agent to be monitored, for the entry as an object of trap;
an effective time management processing unit issuing a release demand for deleting the entry as the object of trap or issuing a time extension demand for continuing the entry as the object of trap, in response to a release validation demand from said agent; and
a trap monitor processing unit receiving and processing a trap from an agent which has made an entry demand as the object of trap;

said agent comprising:
a trap entry processing unit entering an address of the object of trap and trap effective time into a database upon the receipt of a trap entry demand from said manager;
a trap issuance processing unit referring to said database upon the occurrence of trap to issue a trap to said manager entered as the object of trap;
a timeout monitor processing unit issuing a release validation demand to a corresponding manager upon the timeout of the trap effective time of said database;
a release processing unit deleting the entry of a corresponding object of trap in said database upon the receipt of a release demand from said manager; and
a time extension processing unit updating a corresponding effective time in said database upon the receipt of a time extension demand from said manager.

2. The trap control system according to claim 1, wherein in the absence of any response in spite of elapse of a certain period of time after the issuance of a release validation demand to said manager, said timeout monitor processing unit of said agent deletes the object of trap which has expired from said database.

3. The trap control system according to claim 1, wherein said trap entry demand issued from said manager contains an authentication ID for an entry as an object of trap into said database of said agent, said entry as the object of trap being deleted from said database in case of coincidence by collation of said authentication ID upon the receipt of a release demand command.

4. The trap control system according to claim 1, wherein said trap demand processing unit, said release processing unit and said time extension processing unit of said agent issue a demand success to said manager in case of having successfully processed a demand from said agent, but issues a demand failure to said manager in case of having failed to process said demand.

5. The trap control system according to claim 1, wherein said trap entry processing unit and said time extension processing unit of said agent have threshold values in the form of the maximum effective time and the minimum effective time of trap effective time such that coincidence with said maximum effective time is made in case the demanded effective time exceeds said maximum effective time and that coincidence with said minimum effective time is made in case the demanded effective time is shorter than said minimum effective time.

6. A trap control system including a manager, an agent and a representative agent which are connected via a network to one another, said agent transferring a trap via said representative agent to said manager, for monitoring, said manager comprising:
a trap entry demand processing unit issuing to said representative agent a trap entry demand which contains an address of an agent to be monitored, a self-address and trap effective time, for entry as an object of trap;
a time management processing unit issuing, with the designation of an agent address, a release demand for deleting the entry as the object of trap or a time extension demand for continuing the entry as the object of trap, in response to a release demand from said representative agent; and a trap monitor processing unit receiving for processing from said representative agent a trap of an agent which has made an entry demand as the object of trap;

said representative agent comprising:
- a database provided separately for each agent;
- a trap entry processing unit which upon the receipt of a trap entry demand from said manager, enters an address as an object of trap and effective time into a database designated by an agent address;
- a trap issuance processing unit referring to a corresponding database upon the post on a trap from said agent, to issue a trap to a manager entered as an object of trap;
- a release validation processing unit issuing a release validation demand of a corresponding agent to manager upon the timeout of the trap effective time of said database;
- a release processing unit deleting the entry of a corresponding object of trap in a database designated by an agent address, upon the receipt of a release demand from said manager; and
- a time extension processing unit updating corresponding effective time in a database designated by an agent address, upon the receipt of a time extension demand from said manager.

\* \* \* \* \*